United States Patent [19]

Nagata et al.

[11] Patent Number: 4,641,066
[45] Date of Patent: Feb. 3, 1987

[54] CONTROL APPARATUS FOR BRUSHLESS MOTOR

[75] Inventors: Masami Nagata; Sumio Yanase, both of Okazaki; Yousuke Setaka, Kariya, all of Japan

[73] Assignee: Nippondenso Co., Ltd., Kariya, Japan

[21] Appl. No.: 780,970

[22] Filed: Sep. 27, 1985

[30] Foreign Application Priority Data

Oct. 4, 1984 [JP] Japan .............................. 59-209445
Feb. 14, 1985 [JP] Japan ................................ 60-28063

[51] Int. Cl.$^4$ .............................................. H02P 6/02
[52] U.S. Cl. ..................................... 318/254; 318/138; 318/439
[58] Field of Search .................... 318/138, 254, 254 A, 318/439

[56] References Cited

U.S. PATENT DOCUMENTS 3,264,539 8/1966 Sander ............................ 318/254 X
3,439,243 4/1969 Roth ............................... 318/254 X Primary Examiner—William M. Shoop, Jr.
Assistant Examiner—Bentsu Ro
Attorney, Agent, or Firm—Cushman, Darby & Cushman

[57] ABSTRACT

A control apparatus detects a suitable starting point during rotational oscillation of a rotor at the start of a brushless motor by combining the polarity of a counter electromotive force generated in an armature coil of an armature winding of the brushless motor for a nonexcited phase due to the rotational oscillation of the rotor (when armature coils for particular phases are excited at the start of the brushless motor) with the pulse edge of an excitation switchover signal obtained from the potential of a neutral point of the armature winding having the armature coils connected in star-connection and that of a neutral point of a detecting resistance circuit having resistors connected in star-connection. Each of the resistors of the resistance circuit is arranged in parallel with a corresponding one of the armature coils the armature winding. By driving the brushless motor from the detected suitable starting point, it is possible to effect smooth and quick control of the starting operation of the brushless motor.

8 Claims, 23 Drawing Figures

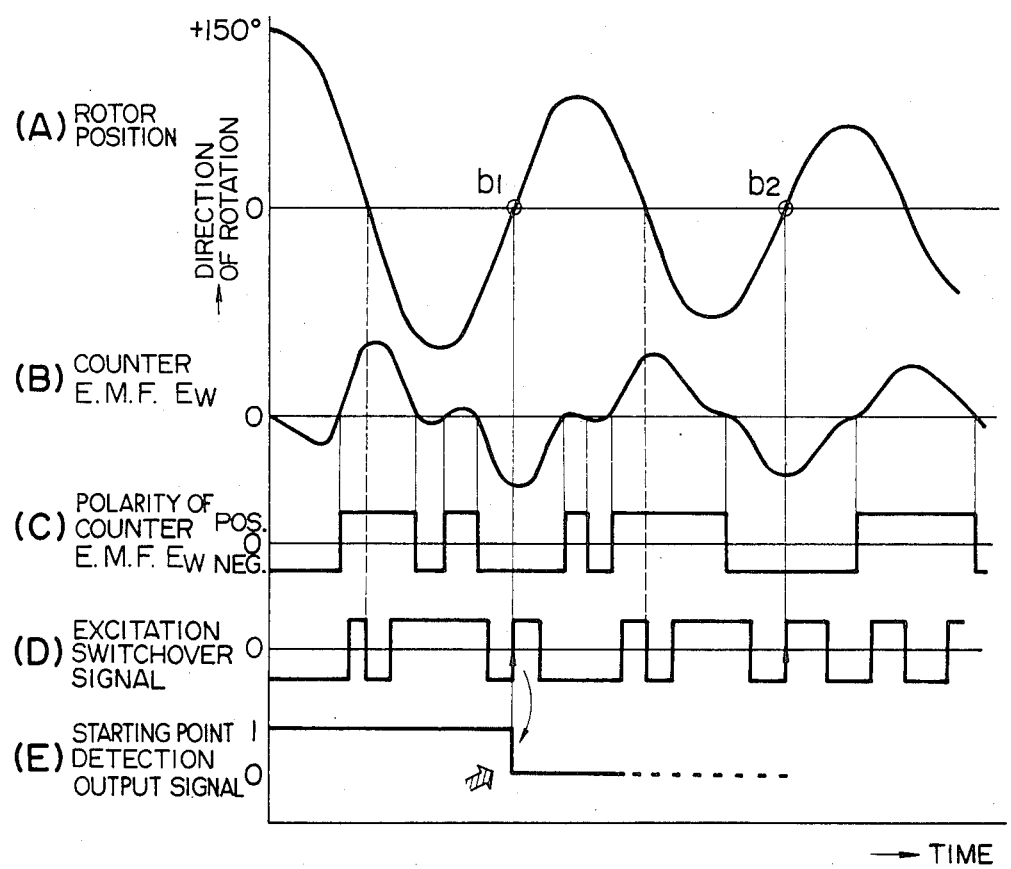

FIG. 12
(A)
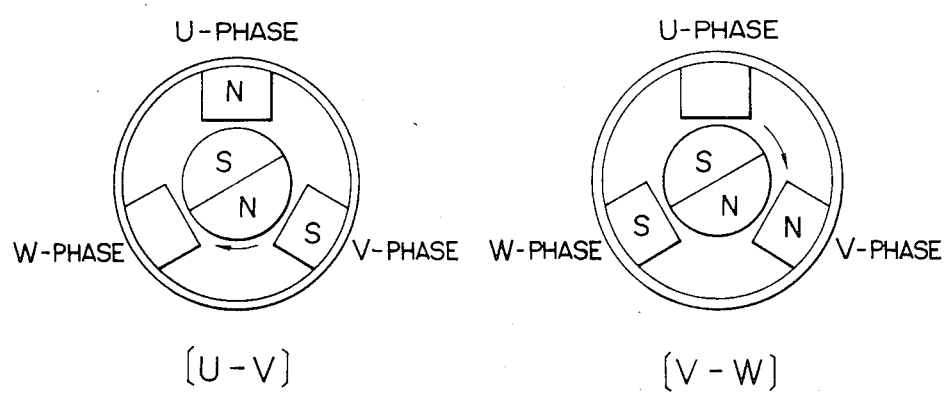
[U-V]
(B)
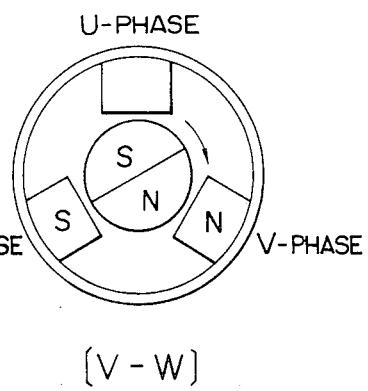
[V-W]
(C)
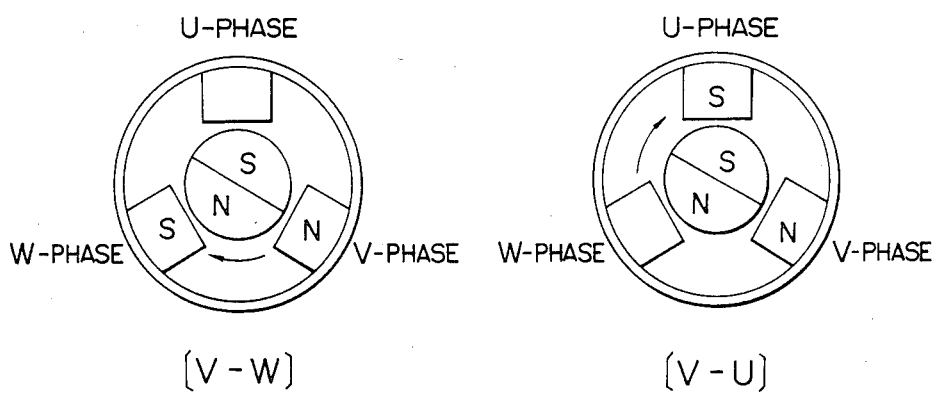
[V-W]
(D)
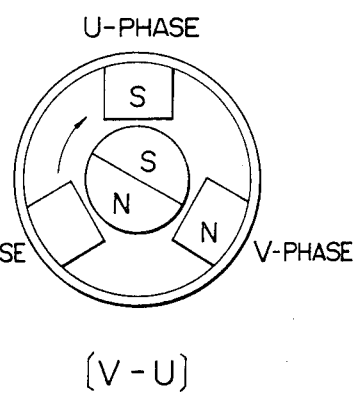
[V-U]

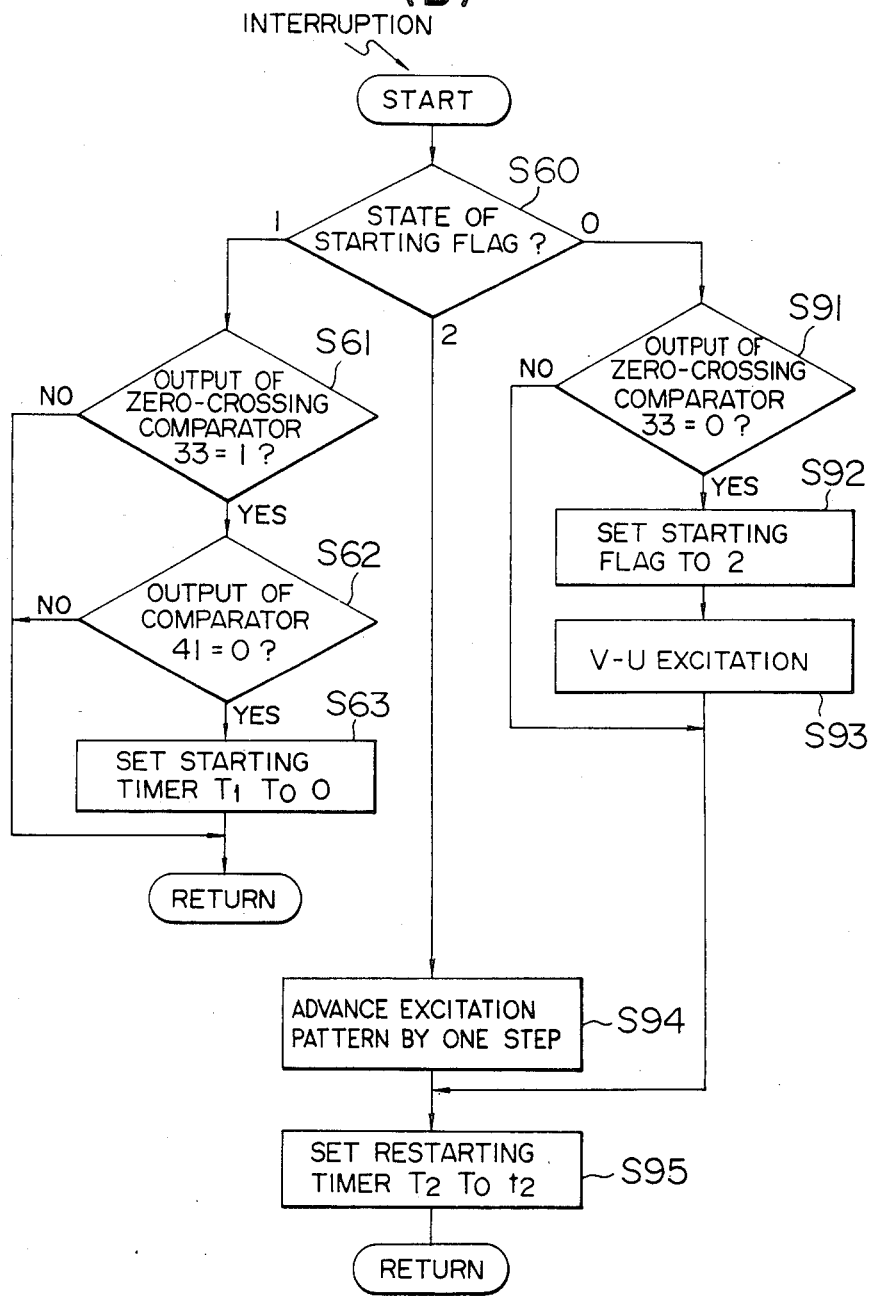

CONTROL APPARATUS FOR BRUSHLESS MOTOR

BACKGROUND OF THE INVENTION

1. FIELD OF THE INVENTION

The present invention relates to a control apparatus for a brushless motor whose exciting phases are switched over in accordance with a signal of a counter electromotive force (counter e.m.f.) generated in the stator winding, and, in particular, relates to a control apparatus which is improved effectively control the starting operation of the brushless motor.

2. DESCRIPTION OF THE PRIOR ART

A brushless motor has no brush, commutator or the like, and hence its structure is simple, no spark is generated during its operation, and the safety thereof is high. For these reasons, wide application of the brushless motor is expected as compared with a D.C. motor.

In the brushless motor, the switching over of exciting phases is carried out in accordance with a counter e.m.f. in the stator winding. Accordingly, at the time of starting, since the counter e.m.f. is not generated, a rotating magnetic field is supplied externally and forcibly, and after the rotation of the rotor has reached a predetermined speed, the switching over of the exciting phases is carried out by detecting the counter e.m.f. in the stator winding. However, in such a starting method, it takes time until the speed increases, and thus the starting response deteriorates.

FIG. 21 schematically shows the structure of a prior art brushless motor to illustrate a rotational position detecting device. Motor 11 includes a rotor 13 provided with a permanent magnet secured to a rotor shaft 12, and an armature winding 14 is disposed facing the rotor 13. A rotary plate 15 for detecting a rotational position of the rotor 13 is fixed to the rotary shaft 12 for coaxial rotation with the rotor 13, and a detecting element 16 is disposed at a position opposite to the rotary plate 15. In this case, as the detecting element 16, a Hall element, magnetoresistor element, etc. is used, and the position detecting rotary plate 15 which is opposite to the detection element 16 is provided with a permanent magnet having a magnetic pole positioned at a specific rotational angle so that the specific rotational angle position of the rotor 13 with respect to the armature winding 14 can be detected. Alternatively, the detecting element 16 may be composed of a light source and a light receiving element, and then the rotary plate 15 may be formed by a slit plate for transmitting the light at a specific rotational angle position, a reflector for reflecting the light, or the like.

In other words, a position of the rotor 13 relative to a stator is detected by a position detecting device 17 composed of the rotary plate 15 and the detecting element 16, and in accordance with the detected positional relationship, a required exciting current is supplied to the armature winding to control the driving of the motor 11.

FIG. 22 shows a drive control system of the brushless motor 11 having the position detecting device 17 arranged as described above, in which, in accordance with a detection signal indicative of a position of the rotor 13 detected by the position detecting device 17, the ON/OFF switching operation of switching devices of a three-phase inverter 18 is controlled to distribute and supply an exciting current to the three-phase armature winding of the motor 11.

Accordingly, in the control means for such a prior art brushless motor, the position detecting device 17 using the Hall element or the like for detecting the rotational angular position becomes necessary, and thus the arrangement of the driving apparatus becomes complicated. Furthermore, in order to form the position detecting device 17, the Hall element, magnetoresistor element or the like is used, and because of the environment-proof property of such a detecting element, a range of the application thereof is inevitably limited.

A control apparatus which does not require the use of the position detecting element such as the Hall element, magnetoresistor element or the like is disclosed by a paper entitled "P.M. BRUSHLESS MOTOR DRIVES" from the Ninth Annual Symposium of the "Incremental Motion Control Systems and Devices" (held in Champaign, Ill., U.S.A., on June 2–5, 1980), published by Incremental Motion Control Systems Society in 1980. Page 305 of the paper discloses a technique which uses a resistance circuit having resistors respectively connected in parallel with three-phase armature coils which are connected in star-connection, detects variations in the potential difference between a neutral point of the resistance circuit and a neutral point of the armature coils, and controls the switching of an excitation current supplied to the armature coils by means of an inverter circuit in accordance with the detected potential difference variations.

In this case, when a rotating magnetic field is used as the means for effecting the starting operation of a brushless motor, there appears a phenomenon in which, at the beginning of the start of the brushless motor, a reverse rotating torque is developed depending on the relative positional relationship between the rotor and the stator, and, after the rotor has once started to rotate in the reverse direction, the rotor changes its rotating direction to a normal forward rotational direction. Thus, at this time of reversing the rotational direction, rotational oscillation occurs, and this makes it impossible to control the starting operation in a normal manner.

In order to prevent such a reverse rotation of the rotor at the start, an exciting current is supplied to armature coils for particular phases for a predetermined time to fix the rotor at a fixed position at the starting time. Then, the exciting current supplied to the armature coils is switched over by an inverter circuit to cause the rotor to continue rotating. In this manner, the reverse rotating operation of the rotor is prevented, and stable starting can be effected.

However, in the prior art brushless motor as described above, there is a problem in that, at the time of fixing the rotor at a fixed rotational position by supplying an exciting current to the armature coils for particular phases, the rotor once effects rotational oscillation and thereafter it converges to its stable point, and thus it requires time before the rotor becomes stabilized, and also it requires time before the brushless motor completes its starting.

SUMMARY OF THE INVENTION

The object of the present invention is to provide a control apparatus for a brushless motor which makes it possible to effect smooth and quick control of the starting of the brushless motor.

The control apparatus of the present invention provides excellent effects such that a time required for the rotational oscillation of the rotor of a brushless motor to converge is reduced and the response of the starting operation of the brushless motor can be improved greatly.

BRIEF DESCRIPTION OF THE DRAWINGS

FIG. 10 is an explanatory diagram showing the correspondence between the pulse edge of an excitation switchover signal and the counter e.m.f. $E_W$;

FIG. 11 is an explanatory diagram illustrating the operation for detecting the starting point;

FIG. 12 is an explanatory diagram for explaining the starting sequence for the model shown in FIG. 4;

DESCRIPTION OF THE PREFERRED EMBODIMENTS

Figure 1:
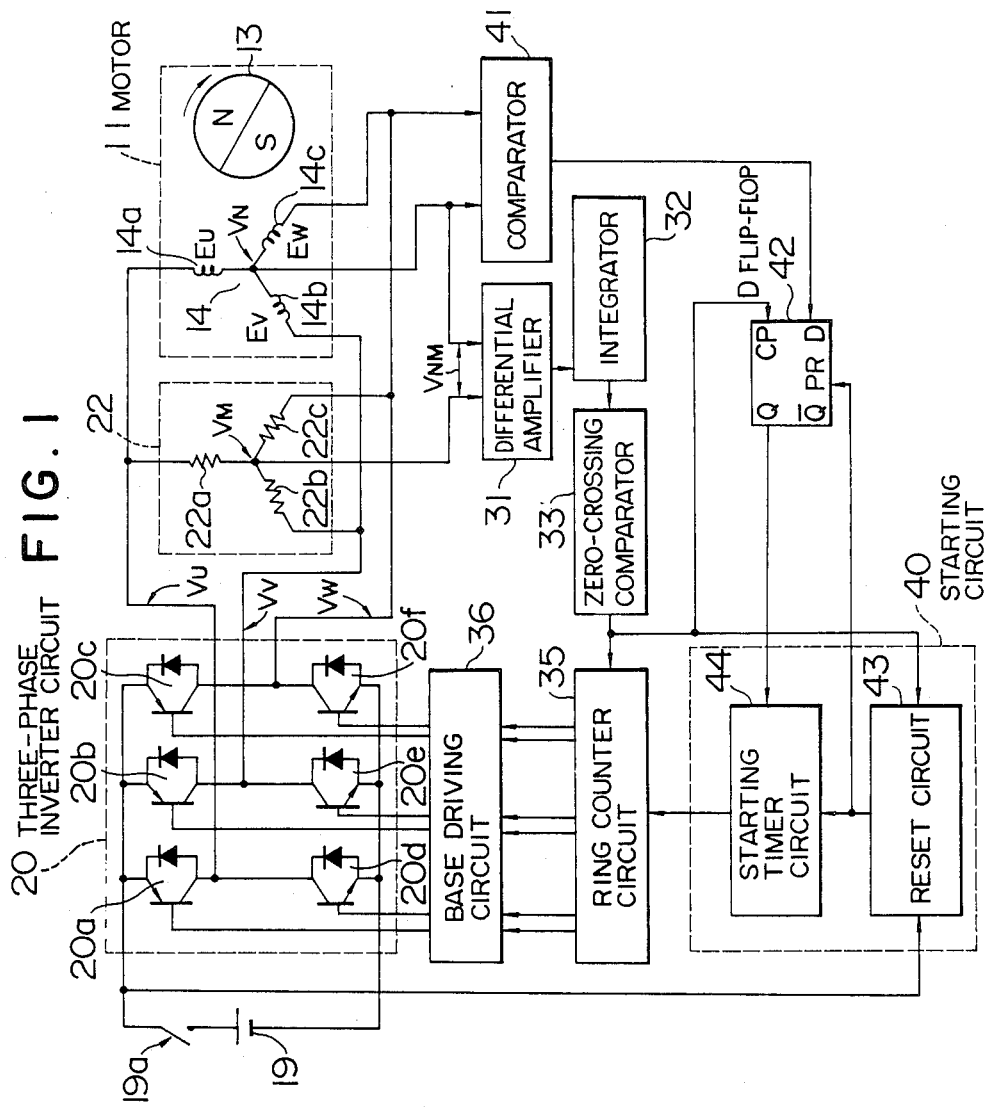
FIG. 1 is an electric circuit diagram showing a control circuit for a brushless motor of an embodiment of the present invention.

The embodiments of the present invention shown in the drawings will be described hereinafter.

FIG. 1 shows a control apparatus for a three-phase brushless motor. In FIG. 1, a brushless motor 11 has an armature winding 14 provided on a stator facing a rotor 13 which comprises a two-pole permanent magnet. The armature winding 14 consists of armature coils 14a, 14b and 14c of the U-phase, V-phase and W-phase, respectively, and these armature coils 14a, 14b and 14c are connected in star-connection.

A D.C. power source 19 is connected to a three-phase inverter circuit 20 via a starting switch 19a. The three-phase inverter circuit 20 includes three pnp type transistors 20a, 20b and 20c, each having an emitter connected to a positive pole side of the D.C. power source 19, and three npn type transistors 20d, 20e and 20f, each having an emitter connected to a negative pole side of the D.C. power source 19. The U-phase armature coil 14a is connected between the transistors 20a and 20d, the V-phase armature coil 14b is connected between the transistors 20b and 20e, and the W-phase armature coil 14c is connected between the transistors 20c and 20f. Further, between the three-phase inverter circuit 20 and the armature winding 14, there is connected a resistance circuit 22 including resistors 22a, 22b, and 22c connected in star-connection so that the resistors 22a, 22b and 22c are in correspondence with the respective phases of the three-phase armature winding 14. The resistance circuit 22 is used for detecting the position of the rotor 13.

Figure 17:
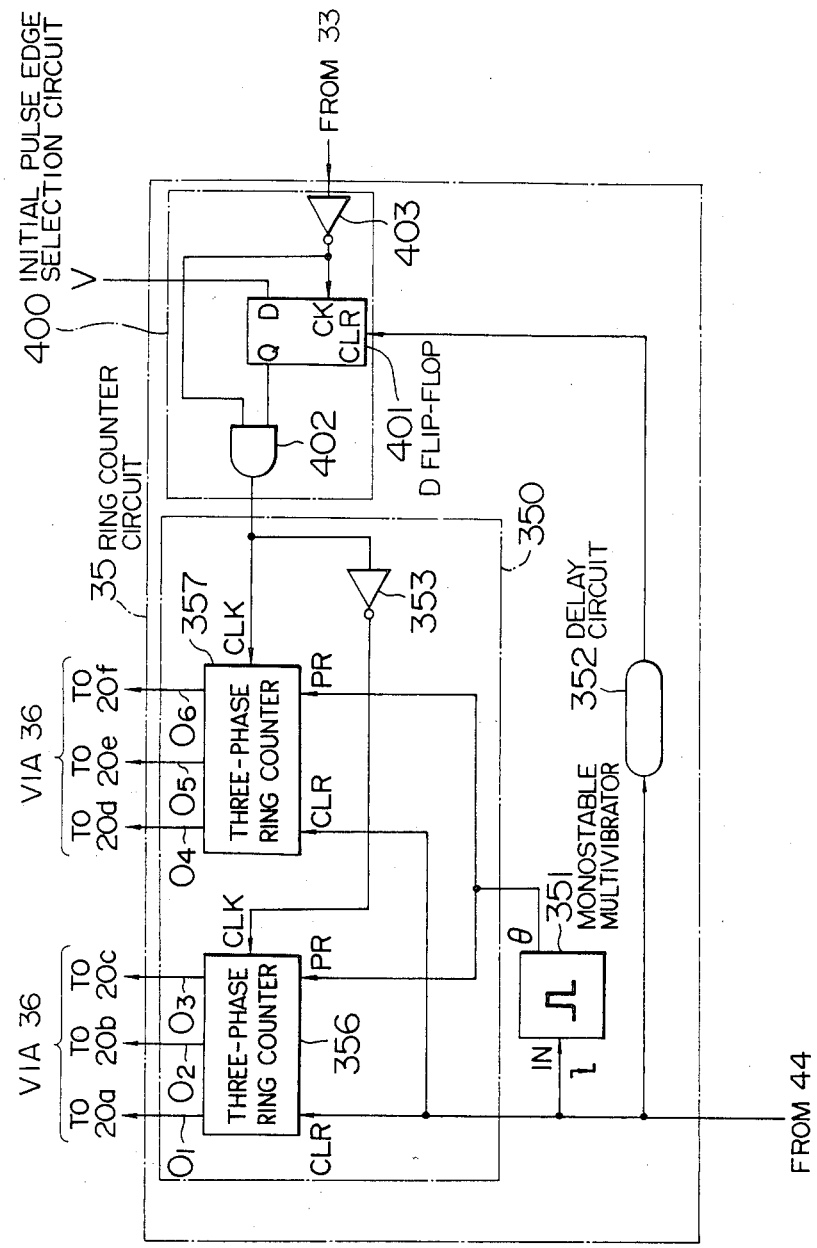
FIG. 17 is a circuit diagram showing the essential structure of the ring counter shown in FIG. 1.

Further, a voltage $V_M$ at a neutral point of the resistance circuit 22 and a voltage $V_N$ at a neutral point of the armature winding 14 are applied to a differential amplifier 31 so that the differential amplifier 31 detects a voltage $V_{NM}$ between the two neutral points. Further, this detected voltage is supplied to an integrator 32, and the integrated output thereof is supplied to a zero-crossing comparator 33. Here, the differential amplifier 31, integrator 32, and zero-crossing comparator 33 constitute signal generating means. Next, the output of the zero-crossing comparator 33 is supplied to a ring counter circuit 35. As shown in FIG. 17 which shows the essential structure of the ring counter circuit 35, the output from the zero-crossing comparator 33 is applied through an inverter 403 in an initial pulse edge selection circuit 400 to a CK (clock) terminal of a D flip-flop 401 and to one input terminal of an AND gate 402. A D (data) terminal of the D flip-flop 401 is connected to a power source of a voltage V and its level is always maintained at "1" level, and a Q (output) terminal of the D flip-flop 401 is connected to the other input terminal of the AND gate 402. The output of the AND gate 402 is applied through an inverter 353 to a CLK (clock) terminal of a first three-phase ring counter 356, and, on the other hand, it is connected directly to a CLK (clock) terminal of a second three-phase ring counter 357. Further, the output of a starting timer circuit 44 shown in FIG. 1 is connected to CLR (clear) terminals of the first and second three-phase ring counter circuits 356 and 357, and also it is led through a monostable multivibrator 351 to PR (preset) terminals of the first and second three-phase ring counter circuits 356 and 357, and further it is led through a delay circuit 352 to a CLR (clear) terminal of the D flip-flop 401. The first three-phase ring counter circuit 356 has three output lines $O_1$, $O_2$ and $O_3$ which are respectively led through a base driving circuit 36 shown in FIG. 1 to the bases of the transistors 20a, 20b and 20c in the three-phase inverter circuit 20. Also, the second three-phase ring counter circuit 357 has three output lines $O_4$, $O_5$ and $O_6$ which are respectively led through the base driving circuit 36 to the bases of the transistors 20d, 20e and 20f. The ring counter circuit 35 responds to the output of the zero-crossing comparator 33 and controls the energization (the excitation pattern) of the transistors 20a to 20f in the three-phase inverter circuit 20 through the base driving circuit 36. The base driving circuit 36 amplifies the output of the ring counter circuit 35.

Both ends of the armature coil 14c of the W-phase are connected to a comparator 41 which comprises first detecting means. This comparator 41 detects the polarity of a counter e.m.f. $E_W$ generated by the rotational oscillation of the rotor 13. Further, the output of the comparator 41 is supplied to a D (data) terminal of a D flip-flop 42 which comprises second detecting means. The output of the zero-crossing comparator 33 is further supplied to a CP (clock pulse) terminal of the D flip-flop 42. The initial condition of the D flip-flop 42 is present to "1" level by the output from a reset circuit 43 which is applied to the PR terminal of the D flip-flop 42. Further, the Q output of the D flip-flop 42 is supplied to the starting timer circuit 44. The reset circuit 43 and the starting timer circuit 44 comprise a starting circuit 40. The reset circuit 43 generates a reset signal for restarting the brushless motor 11 when the starting switch 19a is switched on and the output signal of the zero-crossing comparator 33 is not obtained for a predetermined time period, which reset signal is supplied to the D flip-flop 42 and the starting timer circuit 44. The starting timer circuit 44 responds to the reset signal from the reset circuit 43 and supplies to the ring counter circuit 35 an output signal for setting the ring counter circuit 35 to an initial excitation pattern. At the same time, a timer in the starting timer circuit 44 starts its operation, and, at the termination of the timer operation, or at the time of falling of the output of the D flip-flop 42, the starting timer circuit 44 supplies to the ring counter circuit 35 an output signal for advancing the excitation pattern by two steps.

Here, assuming that terminal voltages of the U-phase, V-phase and W-phase with respect to ground are represented by $V_U$, $V_V$ and $V_W$, respectively, and the counter e.m.f. induced in the U-phase, V-phase and W-phase armature coils of the armature winding 14 by the rotation of the rotor 13 are represented by $E_U$, $E_V$ and $E_W$, respectively, and a neutral point potential of the armature winding 14 is represented by $V_N$, and a neutral point potential of the resistance circuit 22 is represented by $V_M$, and a potential difference between the two neutral points is represented by $V_{NM}$, then the potentials $V_M$ and $V_N$ are expressed by the following equations:

$$V_M = (\tfrac{1}{3})(V_U + V_V + V_W), \text{ and}$$

$$V_N = (\tfrac{1}{3})\{(V_U - E_U) + (V_V - E_V) + (V_W - E_W)\}$$

Further, the potential difference $V_{NM}$ between the neutral points is expressed by the following equation:

$$V_{NM} = V_M - V_N = (\tfrac{1}{3})(E_U + E_V + E_W)$$

Thus, it is seen that the potential difference $V_{NM}$ is one third ($\tfrac{1}{3}$) of the sum of the counter e.m.f. induced in the armature coils of the armature winding 14 for the respective phases, so that the terms representative of the applied voltages from the inverter circuit 20 can be eliminated and hence the potential difference $V_{NM}$ is not influenced by these applied voltages.

Figure 2:
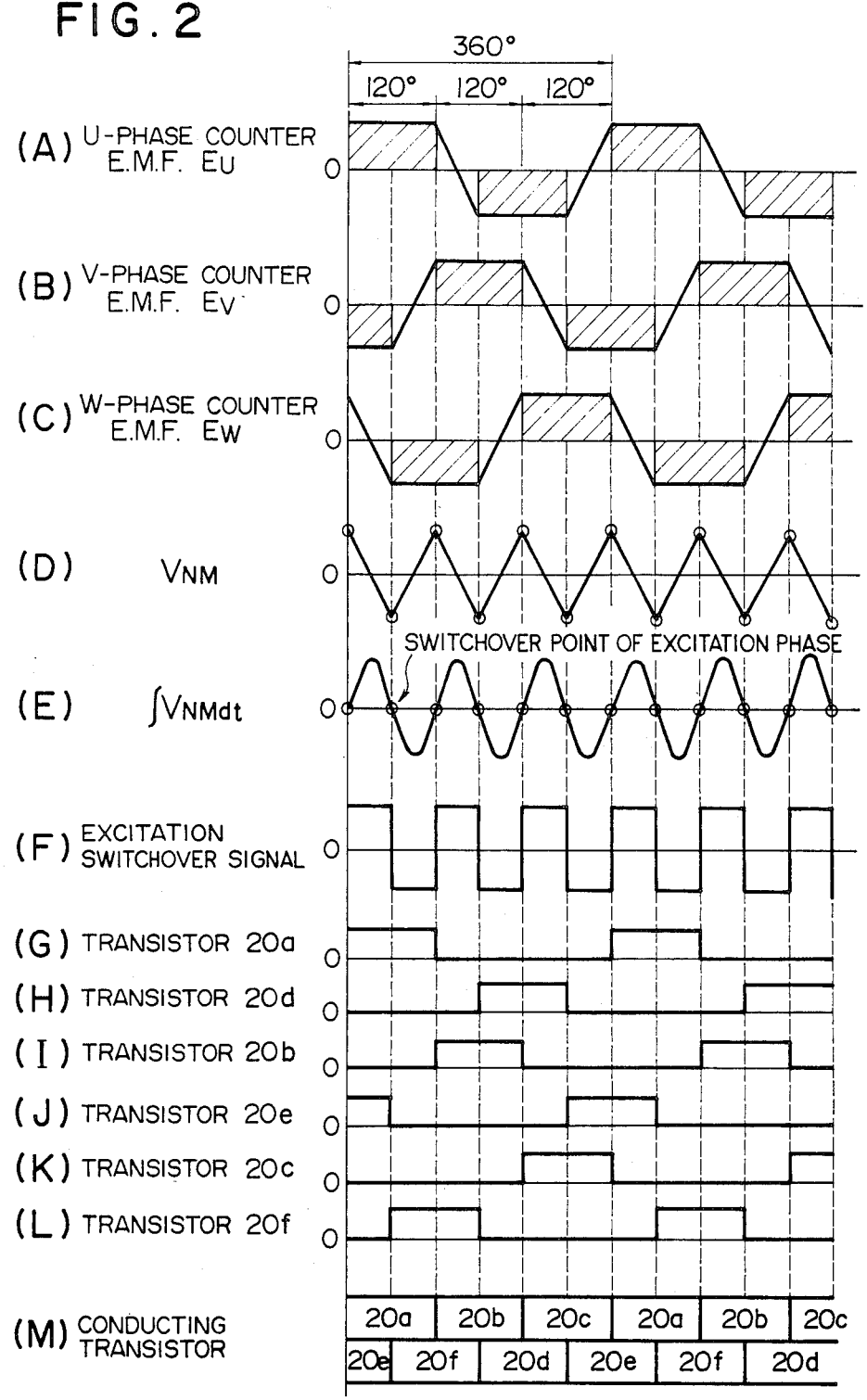
FIG. 2 is a signal waveform diagram showing mutual relationships between signal waveforms generated at various points in the control circuit shown in FIG. 1.

Now, assuming that the counter e.m.f. $E_U$, $E_V$ and $E_W$ induced in the armature coils of the armature winding 14 for the respective phases have trapezoidal waveforms of 120° phase shift as shown at (A) to (C) in FIG. 2, the potential difference $V_{NM}$ obtained by the differential amplifier 31 has a triangular waveform having harmonic components substantially equal to three or an odd multiple of three, because of the homopolar character in a symmetrical three-phase system. With the voltage waveforms $E_U$, $E_V$ and $E_W$ as shown in FIG. 2, an energization period of the armature winding 14 is represented by a flat portion of each counter e.m.f. (a hatched portion of the waveform shown at (A) to (C) in FIG. 2), and a switchover point between the exciting phases coincides with a peak point of the potential difference $V_{NM}$. However, it is difficult to accurately detect the peak point of the potential difference $V_{NM}$, since the amplitude of the potential difference $V_{NM}$ varies depending on the speed value of the motor. Further, when noise signals are involved, it becomes all the more difficult to accurately catch the peak point of the potential difference $V_{NM}$.

For this reasin, the potential difference $V_{NM}$ is integrated in the integrator 32 to obtain an integration waveform as shown at (E) in FIG. 2 so that the peak point detection is replaced by the detection of a zero-crossing point. By doing so, it is possible to obtain a waveform having an amplitude which does not vary depending on the speed value of the motor, and the detection of the zero-crossing point becomes easy at low speeds, and further the detection becomes more noise-resistant. Further, since the counter e.m.f. is proportional to the rate of a change of the interlinking magnetic flux, when the interlinking magnetic flux for the respective phases is represented by $\phi_U$, $\phi_V$ and $\phi_W$, the potential difference $V_{NM}$ is expressed by the following equation:

$$\dot{V}_{NM} = (\tfrac{1}{3})(\dot{E}_U + \dot{E}_V + \dot{E}_W)$$
$$= (\tfrac{1}{3})\{-k(d\phi_U/dt) - k(d\phi_V/dt) - k(d\phi_W/dt)\}$$

Thus, the integration of the potential difference becomes:

$$\int V_{NM} dt = -(k/3)(\phi_U + \phi_V + \phi_W)$$

Thus, the integration of the potential difference $V_{NM}$ has no relation with the speed value of the brushless motor 11, and the detection can be made at a constant amplitude from a low speed.

Then, by applying the waveform obtained in the integrator 32 to the zero-crossing comparator 33, a rectangular wave as shown at (F) in FIG. 2 is obtained. This rectangular wave is applied to the ring counter circuit 35 as an excitation switchover signal. This ring counter circuit 35 synchronizes with the rise and fall of the rectangular wave signal from the zero-crossing comparator 33 and sequentially produces a driving signal for driving each of the transistors 20a to 20f in the three-phase inverter circuit 20. Here, (G) to (L) in FIG. 2 show energizing signals for the respective transistors 20a to 20f. Further, reference numerals shown at (M) in FIG. 2 denote conducting transistors.

Figure 3:
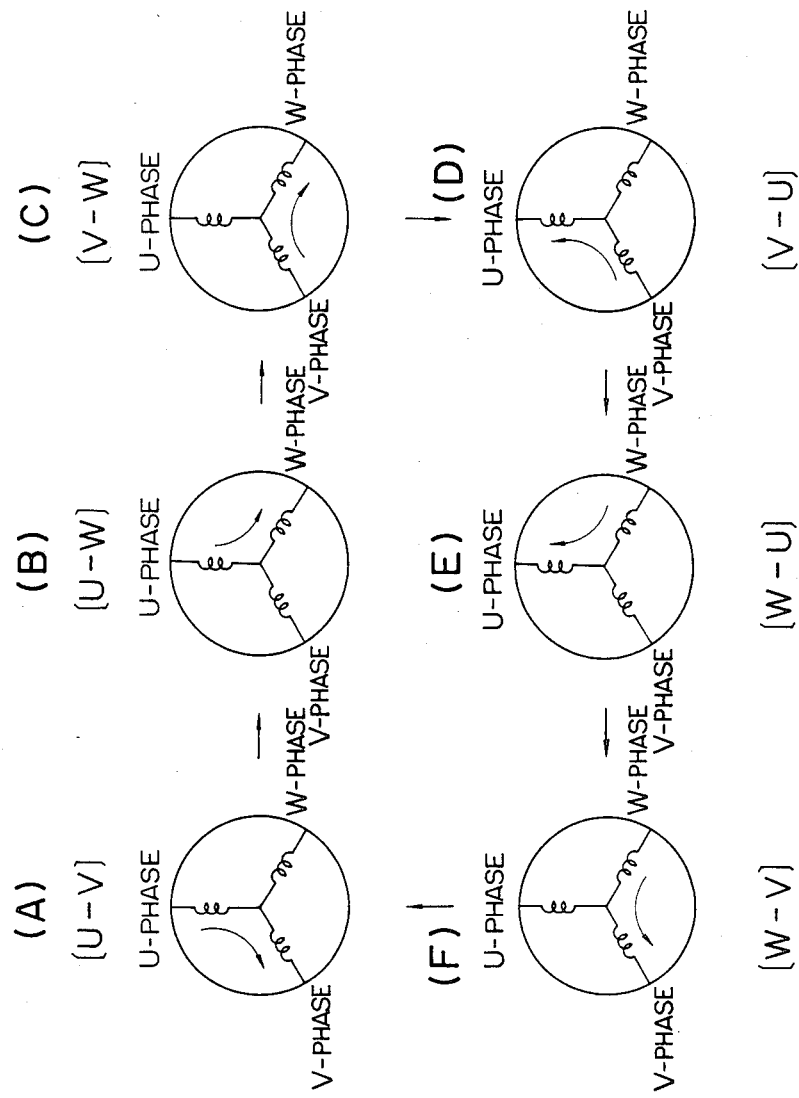
FIG. 3 is an explanatory diagram for illustrating the sequence of excitation of the armature winding at the time of starting the brushless motor.

Next, the excitation patterns for the armature winding 14 of the brushless motor 11 attained by rendering the respective transistors 20a to 20f in the three-phase inverter circuit 20 conductive are shown in FIG. 3. The excitation patterns are composed of six types of excitation patterns as shown at (A) to (F) in FIG. 3 so that a current is conducted in both directions through two armature coils for two corresponding phases selected arbitrarily from the three phases (U-phase, V-phase and W-phase), the armature coils for the three phases being connected in star-connection. The pattern labelled with [U−V] and shown at (A) in FIG. 3 shows that the transistors 20a and 20e in the three-phase inverter circuit 20 shown in FIG. 1 are rendered conductive and a current flows from the U-phase to V-phase to effect the excitation. The arrow entered along the armature coils for the U and V phases indicates the direction of the current flow. Thus, as shown at (A) to (F) in FIG. 3, by switching over the excitation in the order of [U−V]→[U−W]→[V−W]→[V−U]→[W−U]→[W−V]→[U−V], it is possible to generate a rotating magnetic field in a fixed rotation direction. By reversing this order, it is possible to generate a rotating magnetic field in a rotational direction opposite to the above rotational direction.

Hereinafter, a description will be given of a case in which the excitation is effected in the order shown in FIG. 3. Every time the zero-crossing point (the rise or fall of the output of the zero-crossing comparator 33) of the integration waveform of the potential difference $V_{NM}$ between the neutral points is detected, the excitation pattern is advanced by one step. In other words, the excitation pattern of [U−V] which has been prevailing is shifted to the excitation pattern of [U−W] by one step. Thereafter, every time when the zero-crossing point is detected, the excitation pattern proceeds in the order of [V−W]→[V−U]→[W−U]→[W−V] . . . . Thus, the role of the ring counter circuit 35 is to form the energization patterns shown at (G) to (L) in FIG. 2 in synchronism with the detection of the zero-crossing points. Thus, in accordance with the output of the ring counter circuit 35, each of the transistors 20a to 20f is rendered conductive as shown at (M) in FIG. 2, and by generating the rotating magnetic field by each of the armature coils 14a to 14c in synchronism with the instant position of the rotor 13, the brushless motor 11 can be operated continuously.

Figure 4:
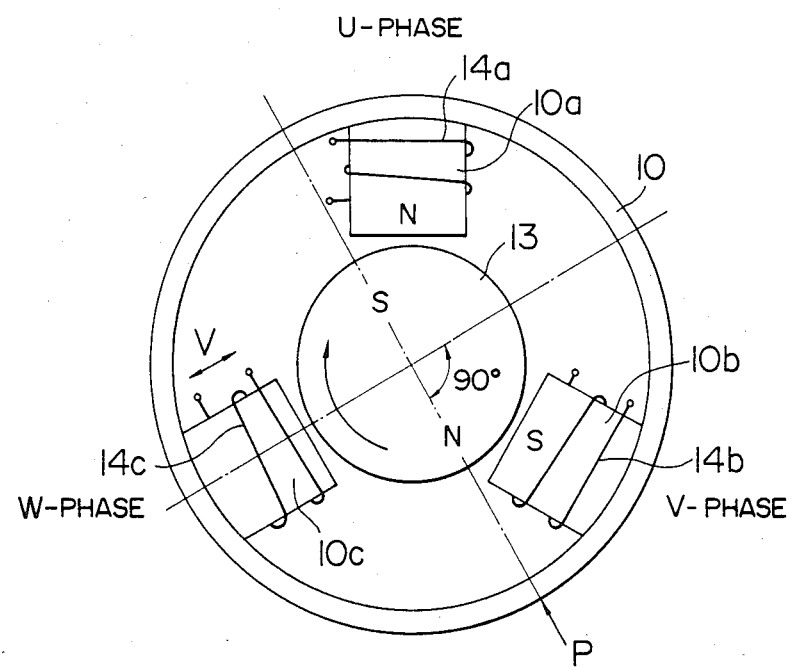
FIG. 4 is a schematic diagram showing a model of a three-phase brushless motor.

In FIG. 4, reference numeral 13 designates a two-pole rotor comprising a permanent magnet, 10a to 10c three-phase stator cores, 10 a housing, 14a a U-phase armature coil, 14b a V-phase armature coil, and 14c a W-phase armature coil. In this model, when the excitation pattern of [U−V] shown at (A) in FIG. 3 is effected, an N-pole and an S-pole are respectively formed by the armature coils 14a and 14b, and the rotor 13 is fixed at a position shown in FIG. 4. At this time, a position of the center line of the magnetic poles of the rotor 13 shown by P in FIG. 4 is assumed to be a reference stable position (an angular position of 0° ).

Figure 5:
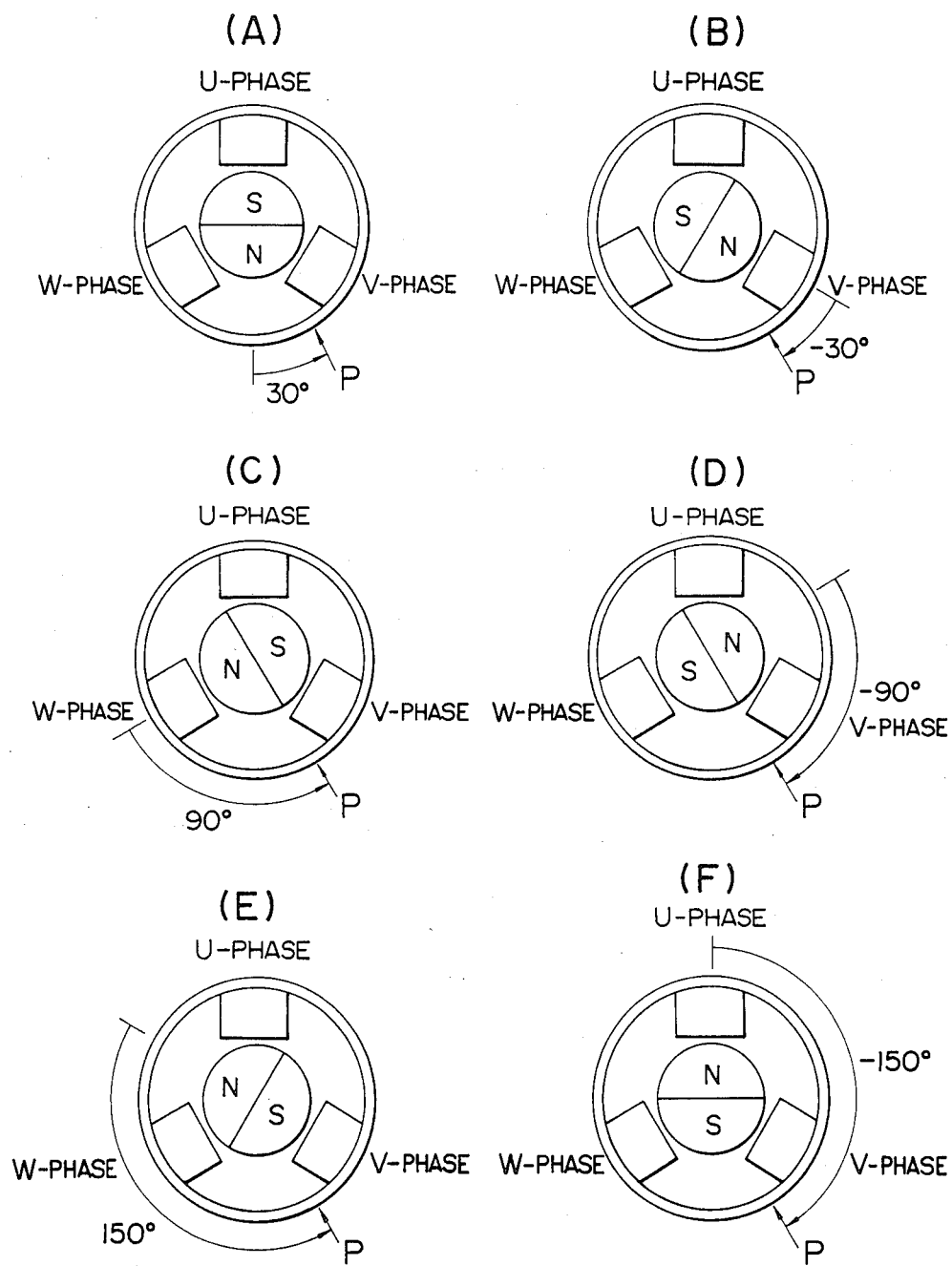
FIGS. 5, (A)-(F) are explanatory diagrams showing examples of rest positions of the rotor before the start of the brushless motor.

Before the starting of the motor 11 and when the excitation has not yet been effected, the rotor 13 necessarily rests stably at any one of six positions shown at (A) to (F) in FIG. 5 due to an attractive force (a detent torque) acting between the permanent magnet of the rotor 13 and the stator. The rest positions of the rotor 13 shown in FIG. 5 correspond to the respective positions of the rotor 13 making angles of ±30°, ±90° and ±150° with the reference stable position shown by P in FIG. 4.

Figure 6:
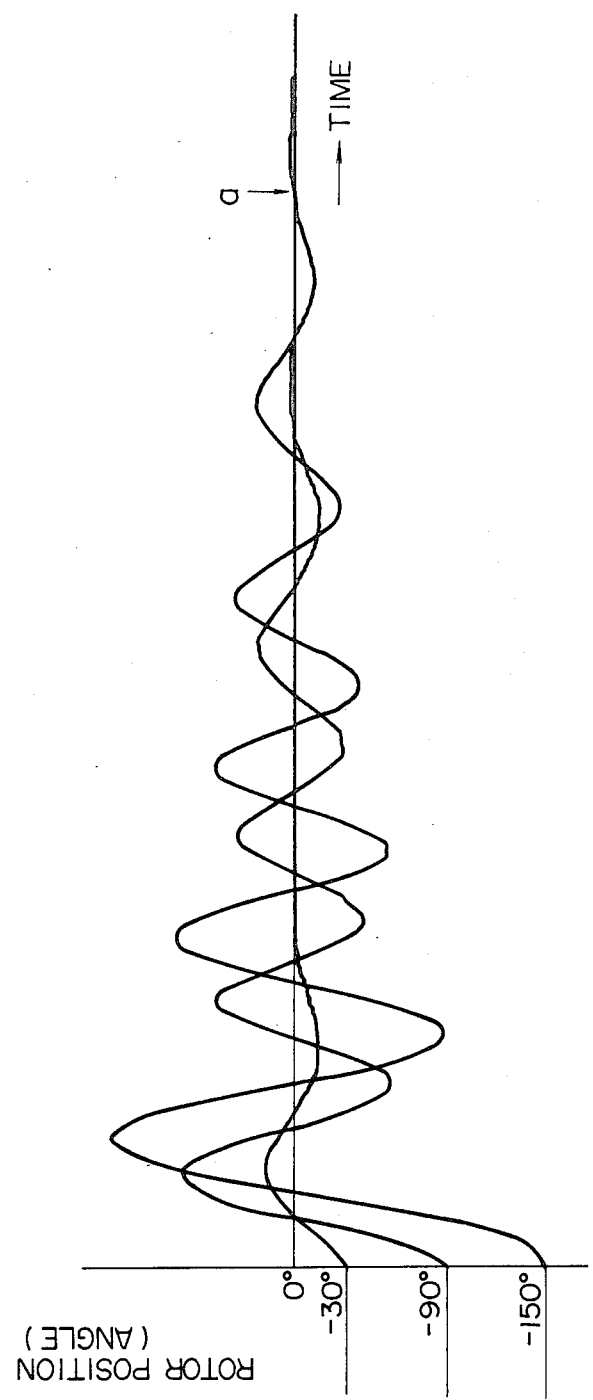
FIGS. 6 and 7 are rotational oscillation waveform diagrams showing states of oscillation damping of the rotor.

At the start of the brushless motor, if particular excitation, for example, the excitation of the [U−V] excitation pattern is effected, the rotor 13 moves from one of the rest positions (±30°, ±90° or ±150°) shown in FIG. 5. Then, after the rotor 13 has effected damped rotational oscillation with the above-mentioned stable position as the center of the rotational oscillation, the position of the rotor 13 converges to the stable position. Since the positions of the rotor 13 shown in FIG. 5 are respectively symmetrical with respect to the stable position, FIG. 6 shows only a case where the rotor 13 moves from its rest positions on one side (−30°, −90° and −150°) of the stable position. Further, FIG. 6 shows an experimental result with time as the abscissa and the angle as the ordinate.

Then, the control apparatus of the present invention is designed to operate to attain smooth starting of the motor 11 by switching over and controlling the exciting current flowing through the armature winding 14 by means of the inverter circuit 20 at an instant when the rotationally oscillating rotor 13 passes the reference stable position at a speed in the same direction as the desired direction of revolution.

Figure 7:
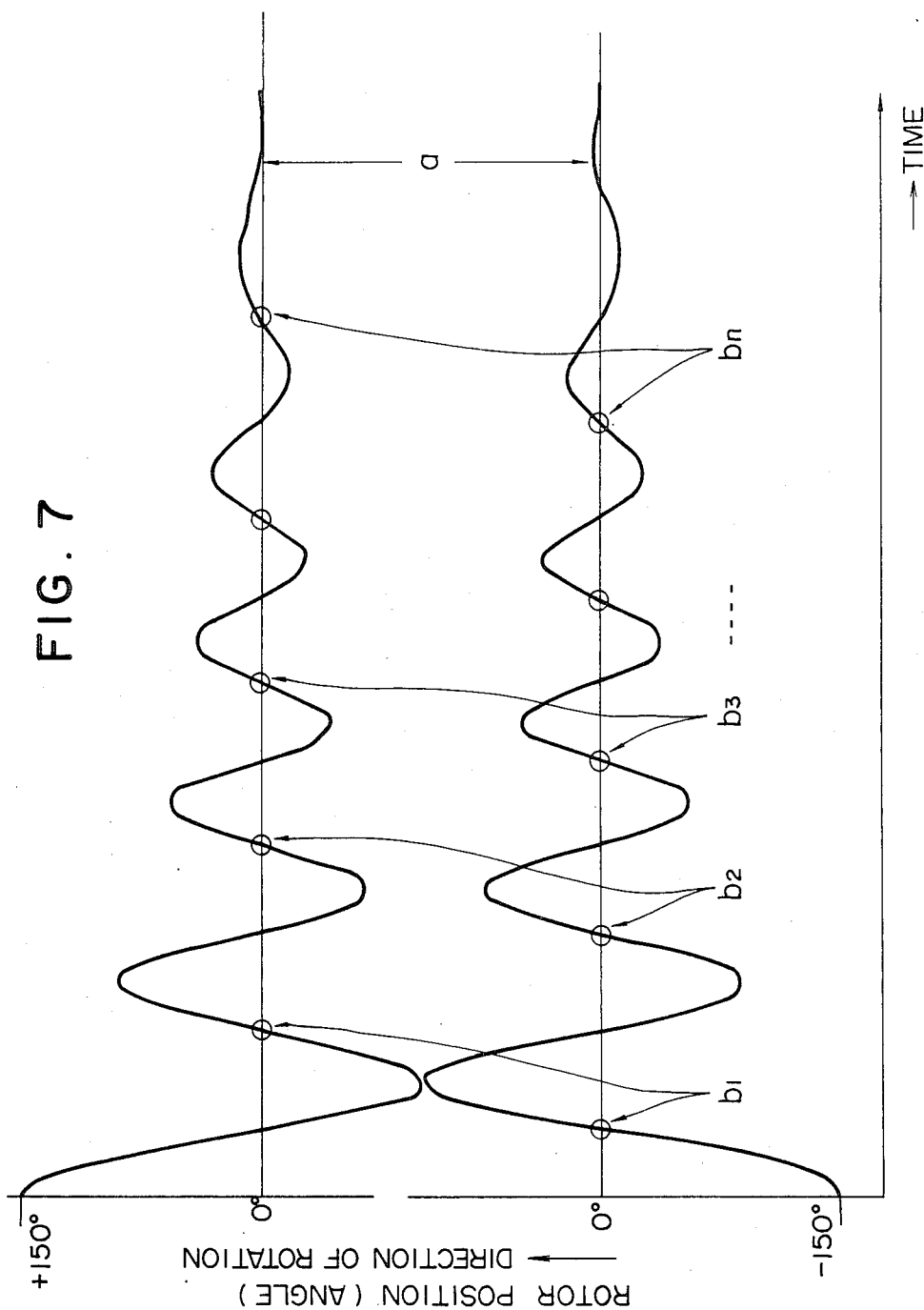

Hereinafter, the starting of the brushless motor 11 will be described in more detail. FIG. 7 shows that the initial rest position of the rotor 13 is at positions ±150° shown at (E) and (F) in FIG. 5. In FIG. 7, among the stable positions of the rotor 13, the positions (starting points) which give a speed component in the same direction as the desired direction of revolution are points $b_1, b_2, ..., b_n$. Thus, as compared with the prior art in which the starting of the brushless motor 11 is delayed until the rotor 13 reaches a point a where the rotational oscillation of the rotor 13 converges, the present invention contemplates to start the motor 11 from any one of the positions (starting points) $b_1, b_2, ..., b_n$, so that it becomes possible to save time required before initiating the starting of the motor 11. Further, when the start of the motor 11 is initiated from the point $b_1$ in FIG. 7, the time required before the starting of the motor 11 can be reduced to minimum. Thus, an explanation will be given of the detection of the point $b_1$ hereunder.

Figure 8:
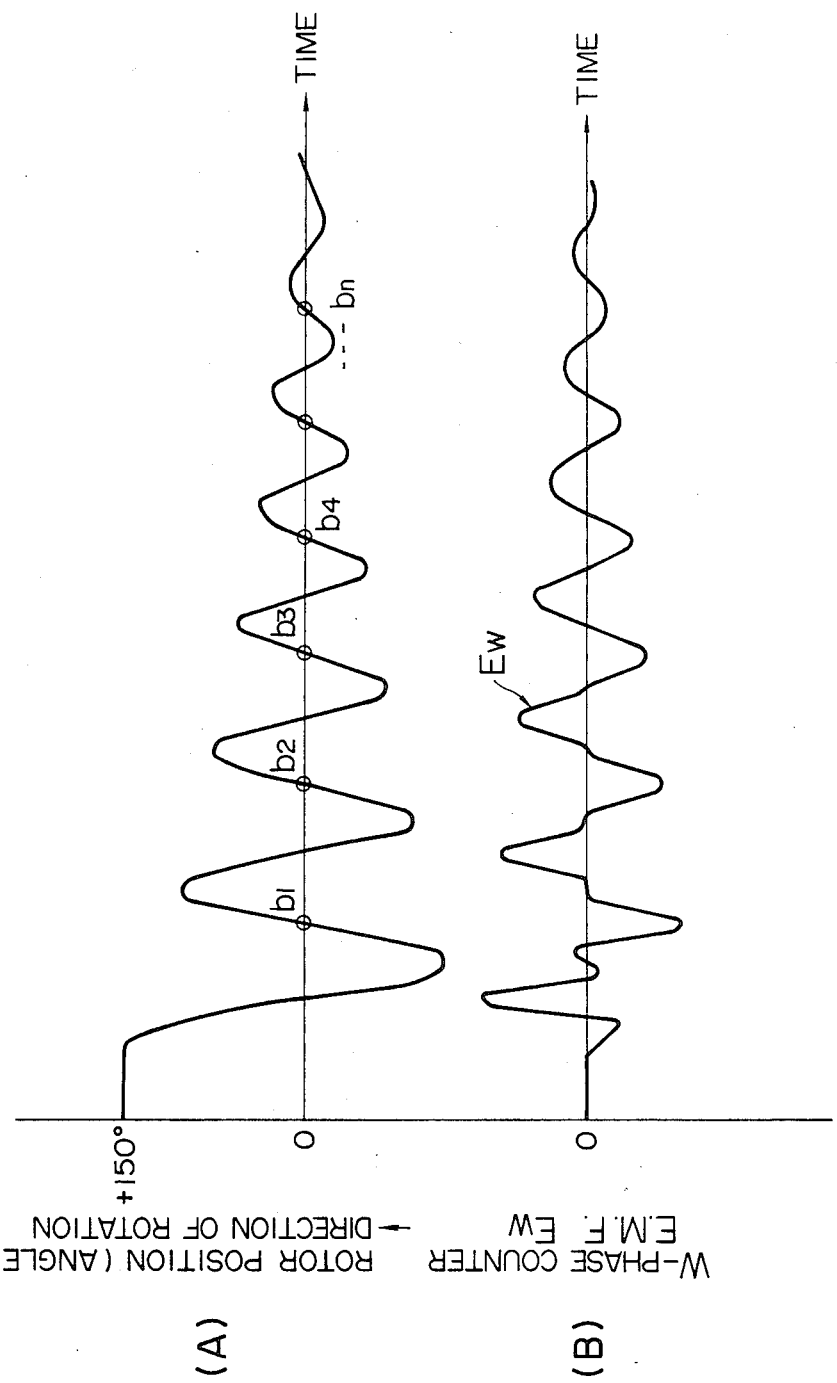
FIGS. 8, (A) and (B) are waveform diagrams showing respectively an oscillating state of the rotor and a state of generation of the counter e.m.f. in the stator winding.

In starting the brushless motor 11, the armature coils 14a and 14b of the U-phase and V-phase, for example, are excited in accordance with the particular excitation pattern of [U−V] shown in FIG. 4. In this case, the N-pole and S-pole are formed in the stator teeth portions 10a and 10b, respectively, as shown in FIG. 4, and the rotor 13 oscillates rotationally. Due to the rotational oscillation of the rotor 13, a counter e.m.f. $E_W$ is generated in the remaining W-phase armature coil 14c. FIG. 8 shows, at (A) and (B), the angular position of the rotor 13 and the counter e.m.f. $E_W$ generated in the W-phase armature coil 14c with respect to the time axis, when the rotor 13 has been resting at the position of +150° before the starting thereof and an exciting current has been applied to flow through the U-phase and V-phase armature coils.

Next, referring to a waveform model shown in FIG. 9, the principle of detection of the $b_1$ point will be described in more detail. Supposing that the counter e.m.f. generated in each phase coil of the armature winding 14 has a 120° trapezoidal waveform as shown at (A), (B) and (C) in FIG. 2, the interlinking magnetic flux $\phi_u, \phi_v,$ and $\phi_w$ for each phase coil of the armature winding 14 may be shown at (A) in FIG. 9. Here, the origin point 0° represents the stable position of the rotor 13 under the initial excitation pattern of [U−V], and, when the rotor 13 passes this point 0° in the forward direction during its rotational oscillation, the point 0° becomes the starting point b₁. The counter e.m.f. $E_W$ in the W-phase armature coil 14c is expressed by the following equation:

$$\dot{E}_W = -k(d\dot{\phi}_w/dt)$$
$$= -k(d\dot{\phi}_w/d\theta) \cdot (d\theta/dt)$$

where $\phi$ is the rotational angle of the rotor 13 with respect to the origin point. From the above equation, the counter e.m.f. $E_W$ is a product of the rate of change of the interlinking magnetic flux of the W-phase, $(d\phi_w/d\phi)$, and the speed value of the rotor 13. Here, $d\phi_w/d\phi$ is shown at (C) in FIG. 9.

With a view to the detection of the starting point b₁ without being affected by the speed value of the rotor 13 during the rotational oscillation of the rotor 13, when the polarity of the counter e.m.f. $E_W$ generated in the W-phase armature coil 14c is considered, it is noted that the polarity of the counter e.m.f. $E_W$ becomes negative when the rotor 13 oscillates in the forward direction as shown at (D) in FIG. 9, while, the polarity of the counter e.m.f. $E_W$ becomes positive when the rotor 13 oscillates in the backward direction as shown at (F) in FIG. 9.

Further, as described already in the foregoing, the integration value of the potential difference $V_{NM}$ between the neutral points used in the detection of the position of the rotor 13 is expressed by the following equation:

$$\int V_{NM}dt = -(k/3)(\phi_U + \phi_V + \phi_W)$$

Figure 9:
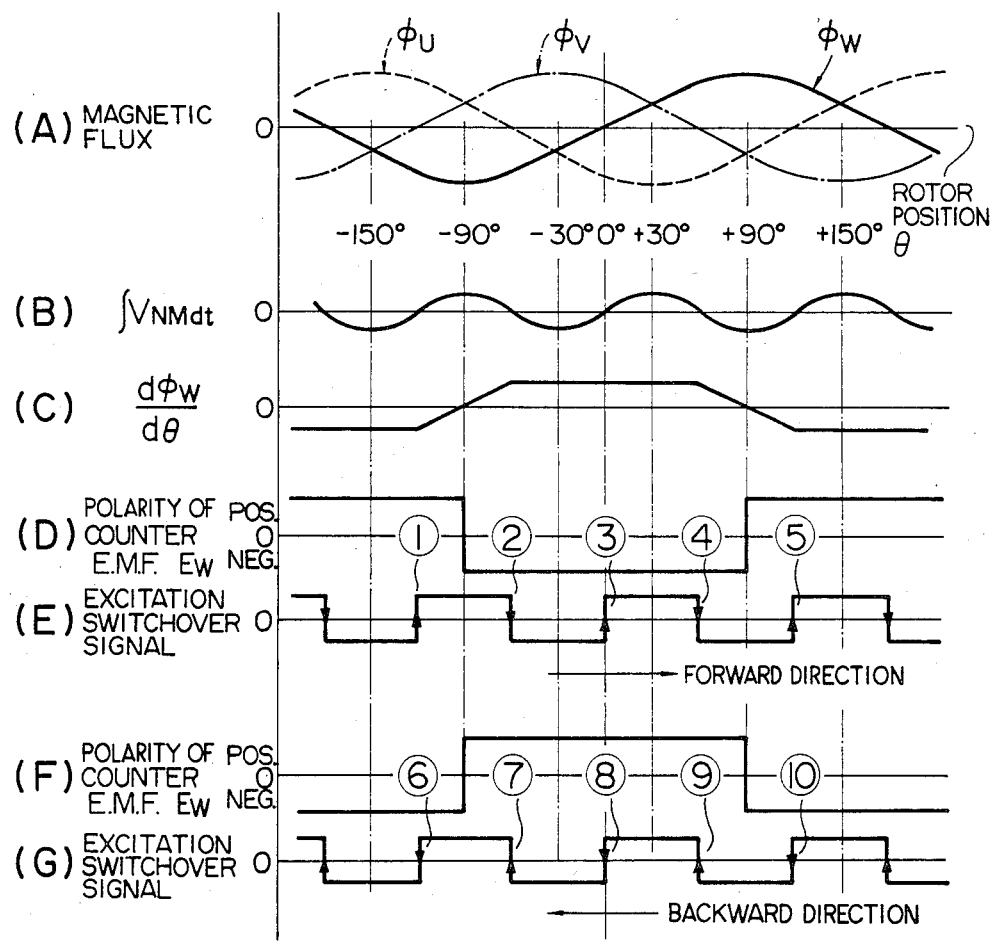
FIG. 9 is a signal waveform diagram showing waveforms of signals for detecting starting points shown in FIGS. 7 and 8.

The waveform of the integration value is shown at (B) in FIG. 9. Then, from the integration waveform, it is possible to obtain an excitation switchover signal by shaping the integration waveform through the zero-crossing comparator 33, which excitation switchover signal is shown at (E) in FIG. 9 when the rotor 13 is oscillating in the forward direction, while, is shown at (G) in FIG. 9 when the rotor 13 is oscillating in the backward direction.

Further, in the case of a brushless motor 11 having a rotor 13 comprising a permanent magnet, by virtue of a detent torque acting on the rotor 13 before the excitation of particular phases (in the present example, the [U−V] excitation pattern) at the time of starting the rotor 13, the rotor 13 can take any one of six positions comprising ±30°, ±90° and ±150° as shown in FIG. 5. Therefore, the angular range $\theta$ of rotational oscillation of the rotor 13 may be regarded to be $-150° < \theta < +150°$.

The combinations of the polarity of the counter e.m.f. $E_W$ of the unexcited phase (W-phase) and the excitation switchover signal obtained from the potential difference $V_{NM}$ between the neutral points shown at (D), (E) and (F), (G) in FIG. 9, when paying attention to the pulse edge portions of the excitation switchover signals, may include ten points: ①, ②, ③, ④, ⑤, ⑥, ⑦, ⑧, ⑨ and ⑩ shown in FIG. 9, which combinations are shown in FIG. 10.

The starting point to be detected in implementing the rotationally oscillating motor starting method described in the foregoing is the point ③ (the stable rotational position which the rotationally oscillating rotor of the brushless motor passes in the forward direction), and, at this point, the polarity of the counter e.m.f. $E_W$ of the unexcited phase (W-phase) is negative and the excitation switchover signal obtained from the potential difference $V_{NM}$ between the neutral points is rising. Further, the above-mentioned combination ③ is the sole one among the ten combinations ① to ⑩.

As described in the foregoing, in accordance with the present invention which combines the polarity of the counter e.m.f. generated, during the rotational oscillation of a rotator 13 of a brushless motor, in the armature coil of a phase, which is not excited while the armature coils of particular phases are excited at the time of starting of the brushless motor, with the pulse edges of the excitation switchover signal obtained from the neutral point potential of the armature winding and the neutral point potential of the detecting resistance circuit connected in star-connection and in parallel with the respective armature coils of the armature winding, it is possible to detect a suitable starting point during the oscillation of the rotor 13 and to achieve smooth starting control.

Figure 13:
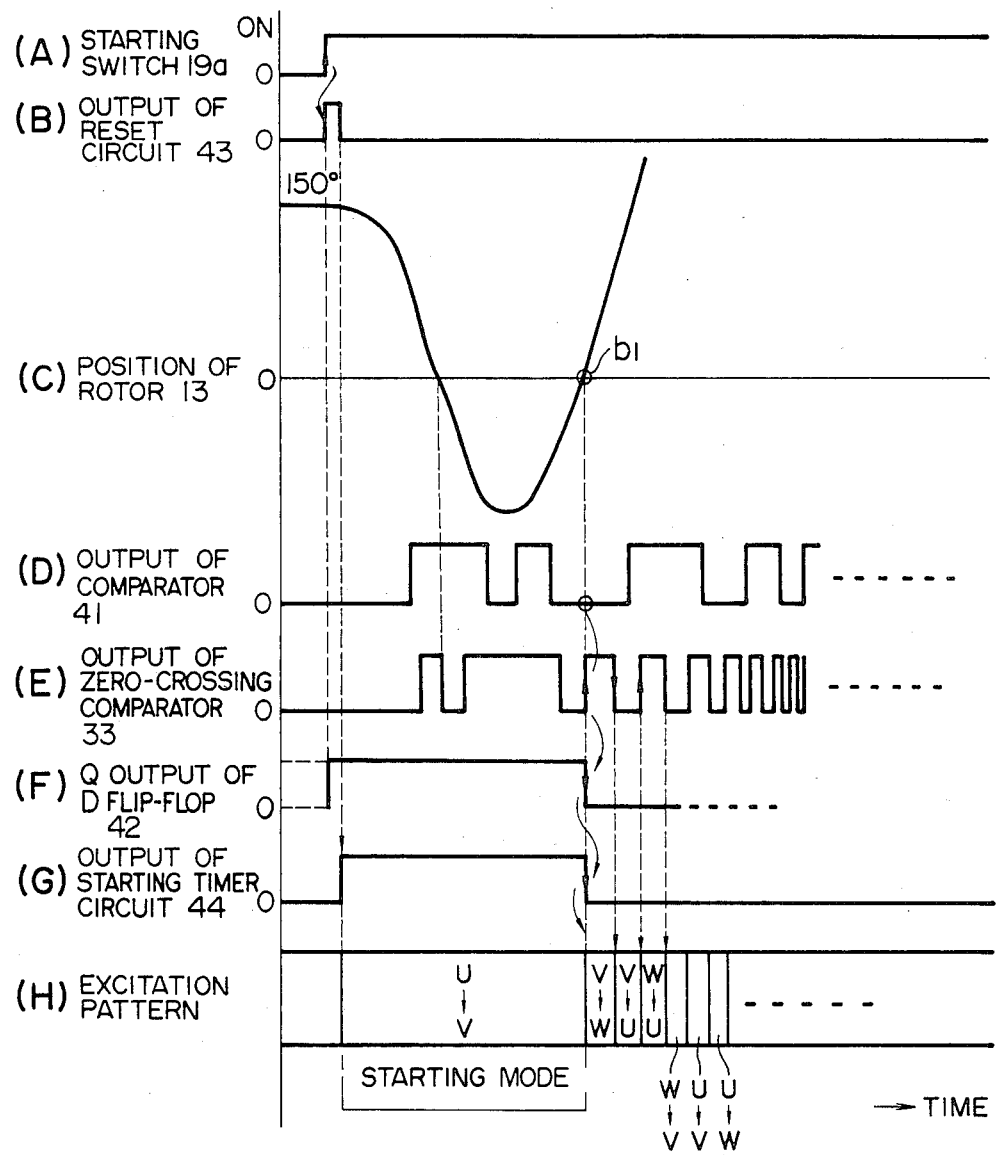
FIG. 13 is a timing diagram illustrating the starting process of the brushless motor.

Next, with reference to FIG. 13, the starting operation of the brushless motor will be described. Upon closing the starting switch 19a shown in FIG. 1, a rectangular wave signal shown at (B) in FIG. 13 is supplied to the starting timer circuit 44 from the reset circuit 43, and, at the fall of this rectangular wave (B), a rectangular wave rises at the output of the starting timer circuit 44 as shown at (G) in FIG. 13. Then, at "1" level of the output rectangular wave of the starting timer circuit 44 shown at (G) in FIG. 13, the first and second three-phase ring counters 356 and 357 shown in FIG. 17 are cleared so that the ring counters 356 and 357 are set to the respective initial conditions.

Then, the output O₁ from the first three-phase ring counter 356 is applied through the base driving circuit 36 to the transistor 20a of the three-phase inverter circuit 20 to turn the transistor 20a conductive. At the same time, the output O₅ from the second ring counter 357 is applied through the base driving circuit 36 to the transistor 20e of the three-phase inverter circuit 20 to turn the transistor 20e conductive. Due to the conduction of the transistors 20a and 20e, an exciting current flows from the positive side of the D.C. power source 19 through the U-phase armature coil 14a and V-phase armature coil 14b to the negative side of the D.C. power source 19. As a result, as shown in FIG. 4, the N-pole is produced in the U-phase stator teeth portion and the S-pole is produced in the V-phase stator teeth portion, and by this excitation, the rotor 13 is moved to a stable position from the position at which the rotor 13 has been resting by virtue of a detent torque acting thereon and begins rotational oscillation with respect to the stable position. FIG. 13 shows a case where the rotor 13 has been resting initially at the position of +150° due to the detent torque acting thereon. The counter e.m.f. $E_W$ generated in the W-phase armature coil 14c by the rotational oscillation of the rotor 13 is supplied to the comparator 41. When it is desired to rotate the rotor 13 in the clockwise direction (the direction shown by the arrow in FIG. 1), it is only required to select a state where the polarity of the counter e.m.f. $E_W$ is negative and the excitation switchover signal is rising. Then, as shown at (D) in FIG. 13, a "0" level output from the comparator 41 is applied to the D (data) terminal of the D flip-flop 42, and, at the same time, by detecting the rise of the excitation switchover signal, which is output from the zero-crossing comparator 33 as shown at (D) in FIG. 11 and at (E) in FIG. 13, a "1" level signal obtained as a resultant detection signal is supplied to the CP (clock pulse) terminal of the D flip-flop 42. As a result, as shown at (E) in FIG. 11, an output signal, which changes from "1" level to "0" level, is generated at the output terminal Q of the D flip-flop 42. Then, a signal representing the fall of the above output signal is supplied to the starting timer circuit 44 as a detection signal for the starting point $b_1$. In response to this signal, at the time of the fall of the rectangular wave output from the starting timer circuit 44 shown at (G) in FIG. 13, a pulse is delivered from the output of the monostable multivibrator 351 shown in FIG. 17. This output pulse is supplied to the PR (preset) terminals of the first and second three-phase ring counters 356 and 357, and signals are delivered from respective outputs $O_2$ and $O_6$ *l of the first and second three-phase ring counters 356 and 357, whereby the transistors* 20b and 20f of the three-phase inverter circuit 20 are rendered conductive. This means that, the excitation pattern of [V−V] shown at (A) in FIG. 12 is changed to the excitation pattern of [V−W] shown at (B) in FIG. 12, and that, as seen from FIG. 13 and (A) and (C) in FIG. 3, the excitation pattern is advanced by two steps from the initial excitation or the excitation of the starting mode.

Thereafter, as shown in FIG. 17, the output signal from the starting timer circuit 44 is applied to the CLR (clear) terminal of the D flip-flop 401 through the delay circuit 352, to initialize the D flip-flop 401. Then, at the fall of the output rectangular wave from the zero-crossing comparator 33 shown at (E) in FIG. 13, a "1" level signal is produced from the inverter 403 and is supplied to one input terminal of the AND gate 402 and also to the CK terminal of the D flip-flop 401. Then a "1" level signal is produced from the Q terminal of the D flip-flop 401, and thus a "1" level signal is also produced from the output of the AND gate 402. The "1" level signal from the AND gate 402 is supplied to the CLK terminal of the second three-phase ring counter 357. Thus, the output of the ring counter 357 is shifted once from the output $O_6$ to the output $O_4$. Thus, as seen from (H) in FIG. 13, the excitation pattern of [V−W] shown at (C) in FIG. 12 is advanced by one step to the excitation pattern of [V−U] shown at (D) in FIG. 12.

Next, at the rise of the output rectangular wave from the zero-crossing comparator 33 shown at (E) in FIG. 13, a "0" level signal is generated from the inverter 403 in FIG. 17, and then a "0" level signal output from the AND gate 402 is supplied to the inverter 353, so that a "1" level signal is supplied to the CLK terminal of the first three-phase ring counter 356. Thus, the output of the ring counter 356 is shifted once from the output $O_2$ to the output $O_3$. Thus, as seen from (H) in FIG. 13, the excitation pattern of [V−U] shown at (D) in FIG. 3 is advanced by one step to the excitation pattern of [W−U] shown at (E) in FIG. 3.

As described above, in synchronism with the rise and fall of the output rectangular wave from the zero-crossing comparator 33 shown in FIG. 13, the outputs from the first and second three-phase ring counters are sequentially changed, so that the excitation patterns shown in FIG. 3 are sequentially shifted in the clockwise direction thereby to cause the rotor 13 to rotate, thus causing the brushless motor 11 to start its revolution.

Thus, in the control apparatus of the present invention, as shown in FIG. 13, by exciting the U-phase armature coil and V-phase armature coil of the armature winding 14 of the brushless motor 11, the positioning of the rotor 13 is effected, and, upon detecting an operation point, at which the rotor 13 passes a stable position at a speed in the same rotational direction as the desired rotational direction of the rotor 13, a detection signal is produced, and the detection signal is supplied to the ring counter circuit 35 to drive the same, so that the three-phase inverter circuit 20 is actuated to start the brushless motor 11. Therefore, it is not necessary to await until the rotor 13 converges at a stable position, and it is possible to improve the response of the starting operation of the brushless motor 11.

Further, since the starting point $b_1$ of the brushless motor 11 is determined by detecting the polarity of the counter e.m.f. generated in the armature coil 14c of the W-phase and by detecting the zero-crossing point of the neutral point potential $V_{NM}$, it is possible to detect a point at which the rotor 13 passes a converging position at a speed in the same rotational direction as the desired rotational direction of the rotor 13, with ease and without fail.

Figure 14:
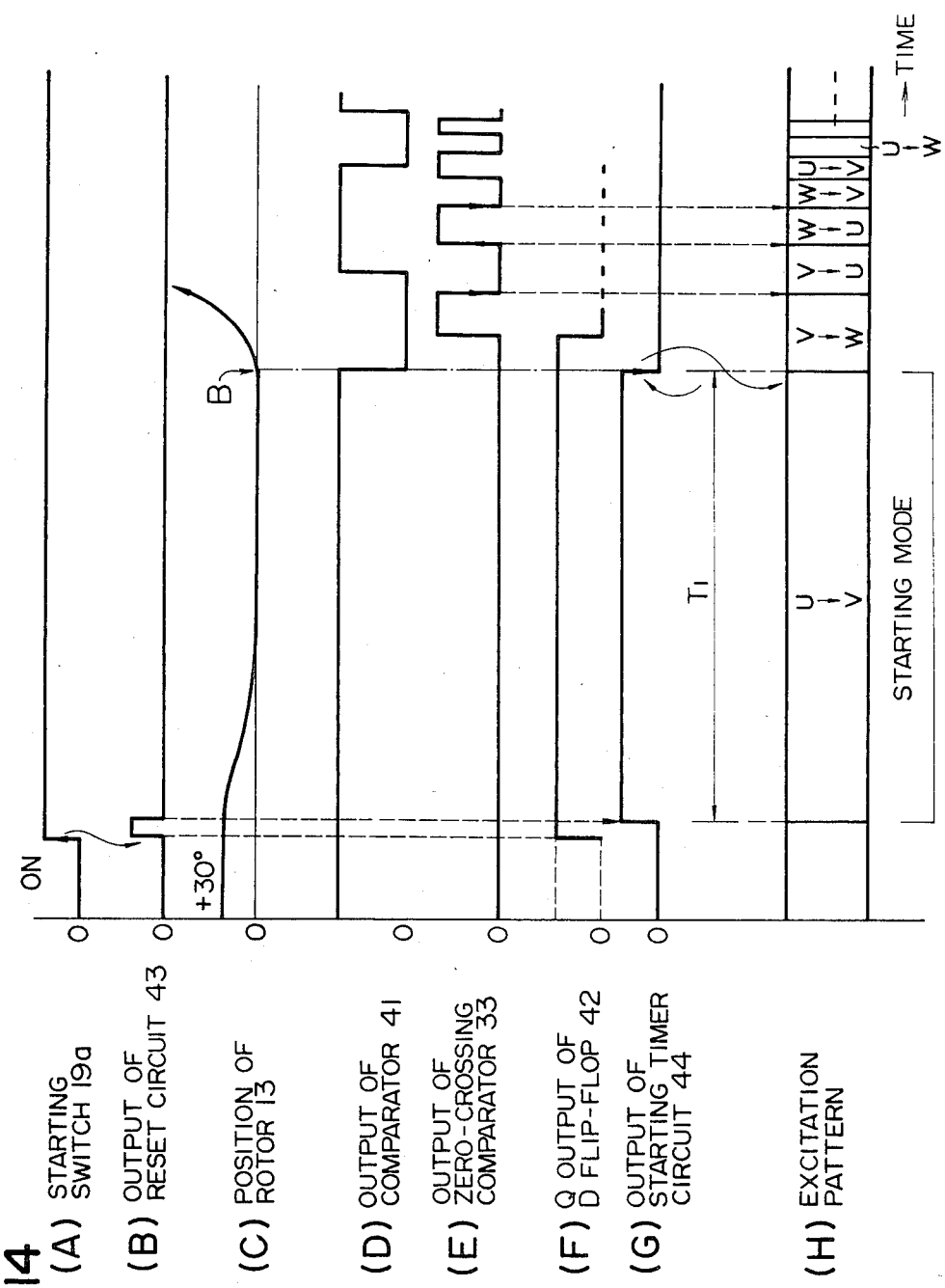
FIG. 14 is a timing diagram illustrating the starting process of the brushless motor when the rotor does not perform rotational oscillation.

FIG. 14 shows an example of a particular case in which the rest position of the rotor 13 is at a position of +30° which is nearest to the stable position at which the rotor 13 is stabilized by the initial excitation pattern of [U−V] and further, even when the excitation is effected in accordance with the initial excitation pattern of [U−V] at the time of starting, the rotor 13 does not oscillate rotationally due to a load condition or the like, but moves smoothly to a stable position. Thus, the detection of the starting point according to the present invention is not applicable here. In this case, however, since the position of the rotor 13 has already converged near a stable position, it is possible to attain the starting of the brushless motor by regarding the rotor 13 as being positioned at the starting point. Accordingly, a reset signal shown at (B) in FIG. 14, which is generated upon turning on the starting switch 19a as shown at (A) in FIG. 14, initializes the starting timer circuit 44 and causes it to start counting a time $T_1$. Then, simultaneously with the fall of the reset signal, the output of the starting timer circuit 44 becomes "1" level as shown at (G) in FIG. 14, and the ring counter circuit 35 provides the initial excitation pattern of [U−V] as shown at (H) in FIG. 14.

Then, if a starting point detection signal is not obtained within a predetermined time $T_1$ since the initial excitation according to the excitation pattern of [U−V] has been initiated at the starting time, upon expiration of the time $T_1$, that is, at a point B shown at (C) in FIG. 14, the output of the starting timer circuit 44 changes to "0" level. Then, as described in the foregoing with reference to FIG. 13, the ring counter circuit 35 generates a signal and forcibly advances the excitation pattern by two steps to the excitation pattern of [V−W]. As a result, the rotor 13 is rotated, and the excitation patterns are sequentially switched over by the changes of the output signal from the zero-crossing comparator 33, thereby effecting the starting of the brushless motor 11. Thus, even when the rotor 13 has come to a standstill at the stable position without oscillating rotationally, the starting of the brushless motor 11 can be achieved without fail.

Figure 15:
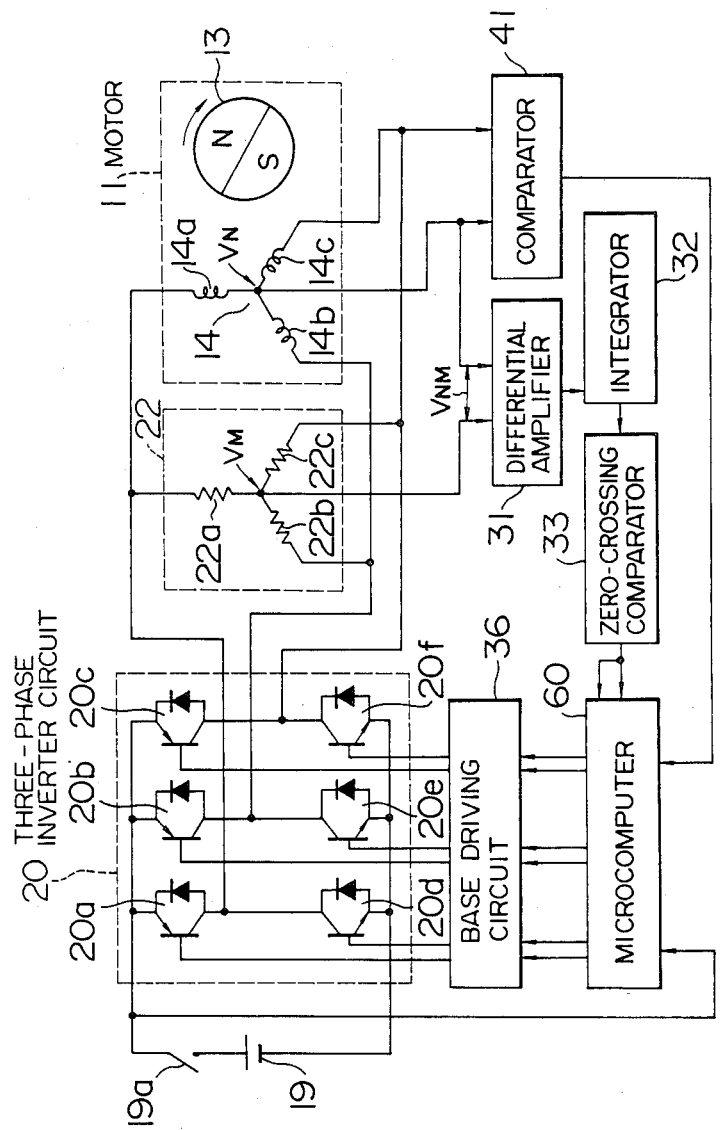
FIG. 15 is an electric circuit diagram showing a control circuit for a brushless motor according to another embodiment of the present invention.

In an embodiment shown in FIG. 15, a microcomputer (MPU) 60 is used.

An excitation switchover signal, which is output from the zero-crossing comparator 33, is supplied to an external interruption terminal and also to an input port of the microcomputer 60. The interruption processing takes place at the rising time and falling time of the excitation switchover signal. Further, an output of the comparator 41 and a signal from the starting switch 19a are applied to the other input ports of the microcomputer 60. The output ports of the microcomputer 60 are connected to the base driving circuit 36.

The processing performed by the microcomputer 60 will be described with reference to a flowchart shown in FIG. 16, (A) and (B). In step S1 in FIG. 16, (A), a state of the starting shown switch 19a is inputted. Proceeding to step S2, if the starting switch 19a, is ON, then the processing proceeds to step S4, while, if it is not ON, the processing proceeds to step S3, where all outputs from the microcomputer 60 to the base driving circuit 36 are turned off and the processing returns to step S1 to await the turning-on of the starting switch 19a. In step S4, a predetermined time $t_1$ is set to the starting timer $T_1$, and in step S5 the initial excitation pattern [U−V] signal is supplied to the three-phase inverter circuit 20 through the base driving circuit 36. Then, in step S6, a starting flag is set to "1". Next, in step S7, an interruption processing is permitted in the microcomputer 60. Then, the processing proceeds to step S8. In step S8, the processing remains in a waiting state until the starting timer $T_1$, which has been set to $t_1$ at step S4, completes counting of the time $t_1$ and its count value becomes "0". During this time period, the brushless motor 11 continues to be excited with the initial excitation pattern [U−V] and stays in a starting mode shown in FIGS. 13 and 14. At this time, the microcomputer 60 is in a state ready to accept the interruption, and the interruption processing shown in FIG. 16, (B) is started in response to an interruption request initiated at the rise or fall in the waveform of the output signal from the zero-crossing comparator 33 such as shown in FIG. 13. Now, turning to FIG. 16, (B), in step S60, the state of the starting flag is checked. Since, the starting flag has been set to "1" in step S6, the processing proceeds to step S61. In step S61, when the output of the zero-crossing comparator 33 is at "0" level, step S61 branches to NO and the processing returns to the main routine in FIG. 16, (A). While, when the output of the zero-crossing comparator 33 is at "1" level, the processing proceeds to step S62. In step S62, when the output of the comparator 41 is not at "0" level, step S62 branches to NO and the processing returns to the main routine in FIG. 16, (A), while, when the output of the comparator 41 is at "0" level, the processing proceeds to a next step S63. In step S63, the starting timer $T_1$ is set to "0" and the processing returns to the main routine. Here, the fact that both of the decisions of steps S61 and S62 are YES represents a case where the starting point corresponding to the point $b_1$ shown in FIG. 13 has been detected.

When the processing returns to the main routine from the interruption routine, the processing is performed in step S8. In step S8, if either of the following conditions:
  (i) in the aforementioned interruption routine, the starting timer $T_1$ has been set to "0" (which corresponds to the point $b_1$ in FIG. 13); and
  (ii) the starting timer $T_1$ has become "0" by itself after the lapse of the time $t_1$ (which corresponds to the point B in FIG. 14),
is satisfied, the processing proceeds to step S9. In step S9, the starting flag is set to "0", and the processing proceeds to step S10 where the three-phase inverter circuit 20 is actuated so that the excitation pattern is advanced by two steps from the initial excitation pattern [U−V] to the excitation pattern [V−W]. Then, the processing proceeds to step S11, where the restarting timer $T_2$ is set to a time $t_2$. In a next step S12, it is decided whether the interruption processing shown in FIG. 16, (B) is requested once or more within the time period $t_2$ set in the restarting timer $T_2$.

When there is no change in the output of the zero-crossing comparator 33 and no request for an interruption processing has been made, the count value of the restarting timer $T_2$ becomes "0" after it has completed counting of the predetermined time $t_2$. In this case, it is decided that either the starting of the brushless motor 11 has not been effected or the brushless motor 11 has stopped rotating, and the processing proceeds to step S13 where the processing for a restarting process is started. In this step S13, the interruption is inhibited, and the processing returns to step S1 in order to restart the brushless motor 11.

Next, the interruption processing, which is performed in step S12 and shown in FIG. 16, (B), will be described.

An interruption processing is requested at the rise or fall in the waveform of the output of the zero-crossing comparator 33, and thus the processing proceeds to step S60. Since the starting flag has been set to "0" in step S9 in FIG. 16, (A), the processing proceeds to step S91. In step S91, it is decided whether the output of the zero-crossing comparator 33 is "0". If the decision of YES has been made in step S91, the processing proceeds to step S92 where the starting flag is set to "2". Then, the processing proceeds to step S93. In step S93, the excitation pattern of the brushless motor 11 is advanced by one step from the excitation pattern [V−W] established in step S10 to the excitation pattern [V−U]. Then, the processing proceeds to step S95. After setting the restarting timer $T_2$ to the time $t_2$ in step S95, the processing returns to the main routine. On the other hand, if the decision made in step S91 is NO, the processing jumps to step S95. Then, after performing a similar processing in step S95, the processing returns to the main routine. It should be noted that the processings in steps S91 to S95 advance the excitation pattern of the brushless motor 11 from [V−W] to [V−U] only at the fall in the waveform of the output of the zero-crissing comparator 33, after the aforementioned starting point has been detected.

Next, once the processing in step 92 has been effected, the starting flag becomes "2". Then, an interruption processing, which will be performed subsequently, proceeds from step S60 to step S94. In step S94, the excitation pattern, which is established by the three-phase inverter circuit 20, is advanced sequentially step by step. That is, each time the output of the zero-crossing comparator 33 is inverted, the excitation pattern is advanced in the order of [V−U]→[W−U]→[W−V]→[U−V]→[U−W], . . . , and so on, as shown at (H) in FIGS. 13 and 14. Then, the processing proceeds to step S95 where the restarting timer $T_2$ is set again to the time $t_2$. After that, the processing returns to the main routine.

Figure 16:
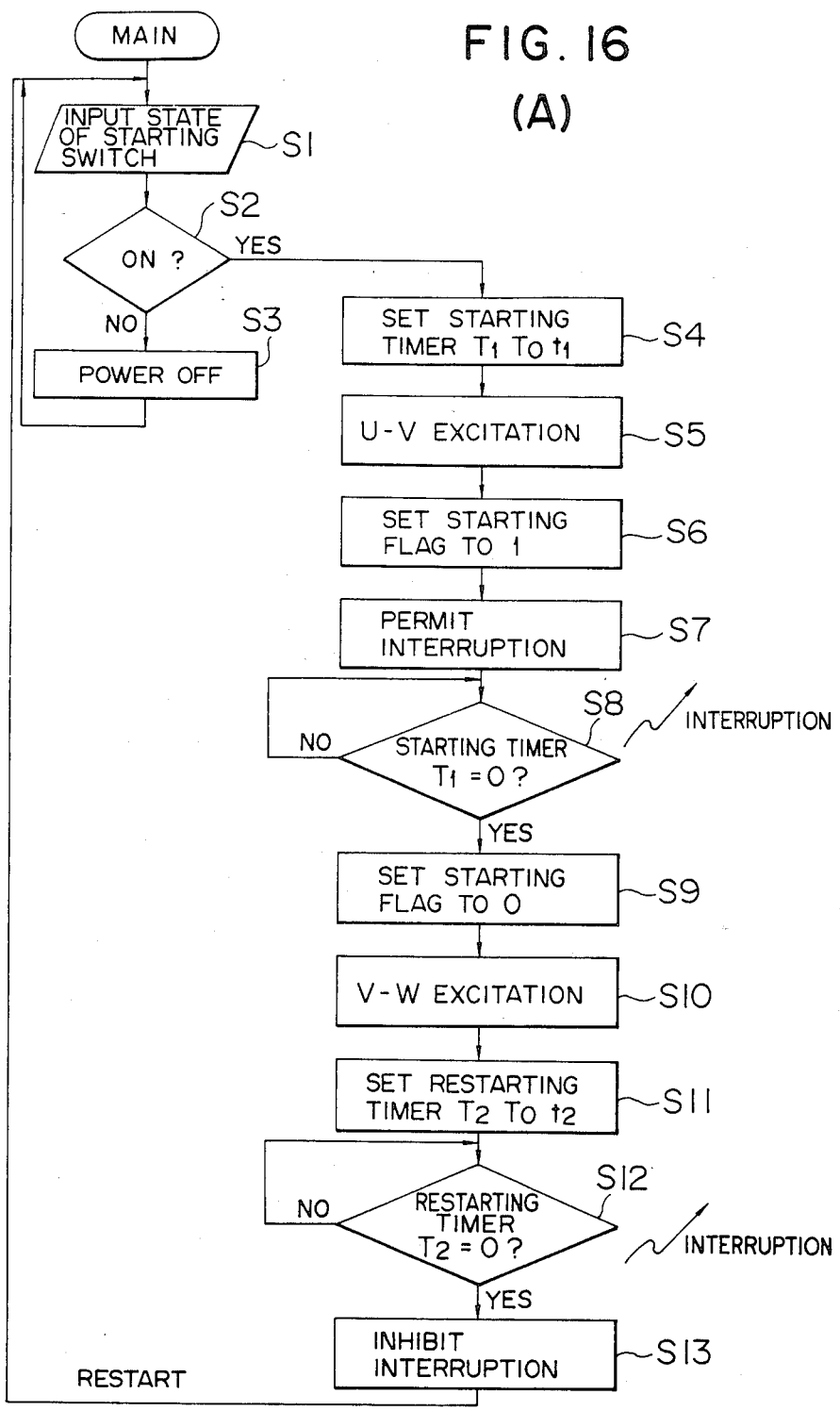
FIGS. 16(A) and 16(B) are flowcharts showing a computing process executed by the microcomputer shown in FIG. 15.

In this manner, the brushless motor 11 can be started in accordance with the procedure as illustrated by the flowcharts in FIGS. 16, (A) and (B).

In the embodiments described above, since the direction of rotation of the rotor 13 is assumed to be in the direction of the arrow shown in FIG. 4, the position of 3 shown at (E) in FIG. 9 (that is, the time at which the polarity of the counter e.m.f. $E_W$ of the W-phase armature coil 14c shown at (D) in FIG. 9 is negative and the excitation switchover signal shown at (E) in FIG. 9 is rising) is detected to attain the starting of the brushless motor 11. However, when the desired direction of rotation of the rotor 13 is opposite to the direction of the arrow, it is required only to detect the position of 8 shown at (G) in FIG. 9 (that is, the time at which the polarity of the counter e.m.f. $E_W$ of the W-phase armature coil 14c shown at (F) in FIG. 9 is positive and the excitation switchover signal shown at (G) in FIG. 9 is falling).

In addition, although the D flip-flop 42 is used in the embodiment shown in FIG. 1 and described above, the other element, for example, a RS flip-flop, JK flip-flop and the like may be used, so far as it is able to detect the starting point $b_1$.

As described in the foregoing, when a current is conducted through the armature coils 14a and 14b of the U-phase and V-phase, respectively, a counter e.m.f. is generated in the remaining armature coil 14c of the W-phase due to the rotational oscillation of the rotor 13. Since the three-phase, that is, U-phase, V-phase and W-phase coils are disposed at equal spatial intervals and the center point of the rotational oscillation (stable position) of the rotor 13 coincides with the center of the W-phase coil 14c, the direction of the magnetic flux interlinking with the W-phase coil 14c changes at the center point of the rotational oscillation of the rotor 13, so that the counter e.m.f. generated in the W-phase coil 14c takes a peak value at this center point, and besides the direction of the change of the interlinking magnetic flux is reversed and hence the polarity of the counter e.m.f. differs depending on the direction of the rotational oscillation of the rotor 13.

For this reason, by determining the peak point of the counter e.m.f., it is possible to detect that the rotor 13 is passing the stable position and also to detect the direction of rotation of the rotor 13 at that instant.

Figure 18:
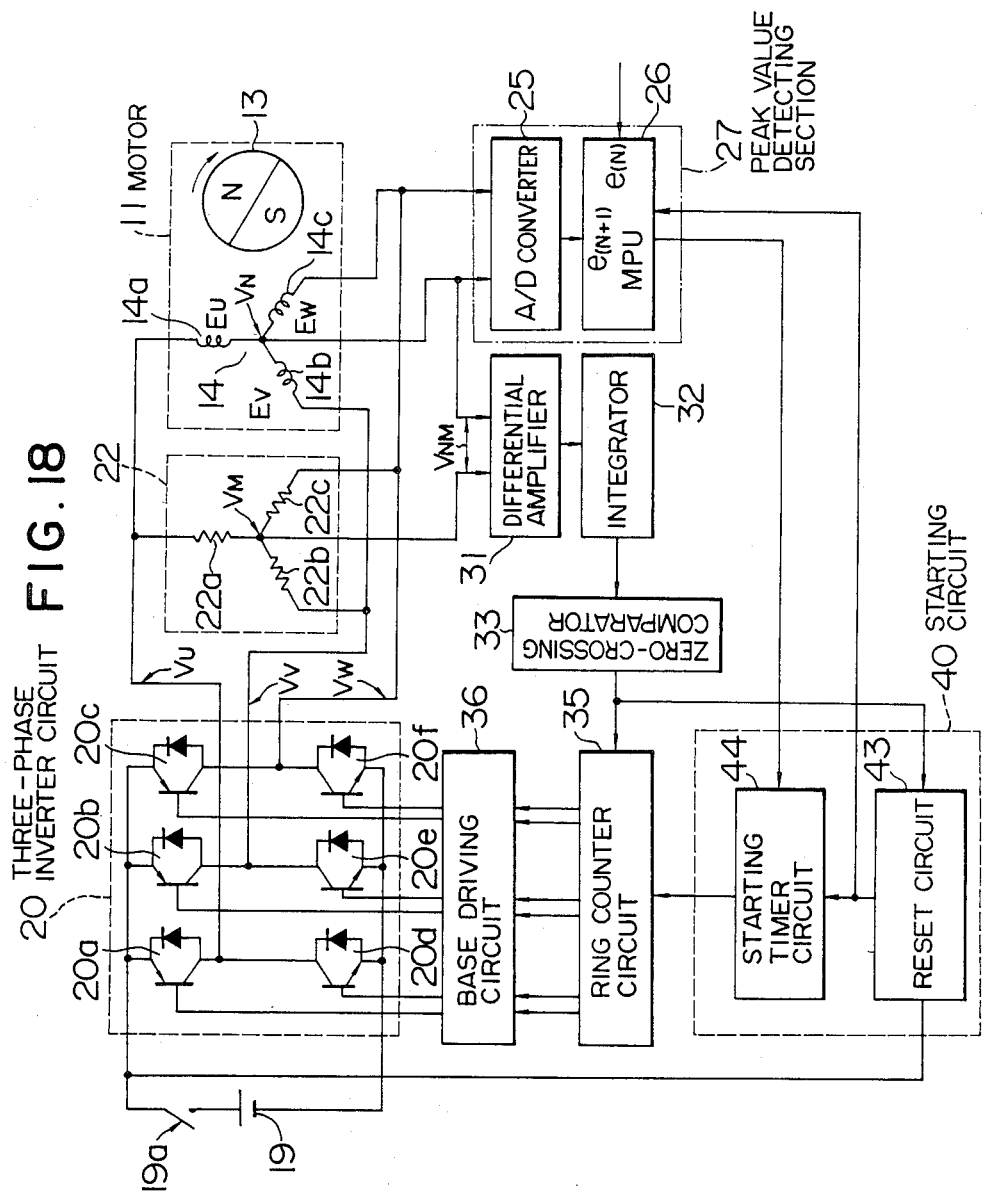
FIG. 18 is an electric circuit diagram showing a control circuit for a brushless motor according to a further embodiment of the present invention.

In another embodiment shown in FIG. 18, a peak value detecting section 27 is connected across both ends of the W-phase armature coil 14c.

In this peak value detecting section 27, a counter e.m.f. generated in the W-phase armature coil 14c is applied to an A/D converter 25, and the output of the A/D converter 25 is applied to a microcomputer unit (MPU) 26, which detects a peak value of the counter e.m.f. generated in the W-phase armature coil 14c. Then, when the peak value of the counter e.m.f. is detected, the output signal from the MPU 26 is supplied to the starting timer circuit 44. Further, the output of the reset circuit 43 is supplied to an input to the MPU 26.

Figure 19:
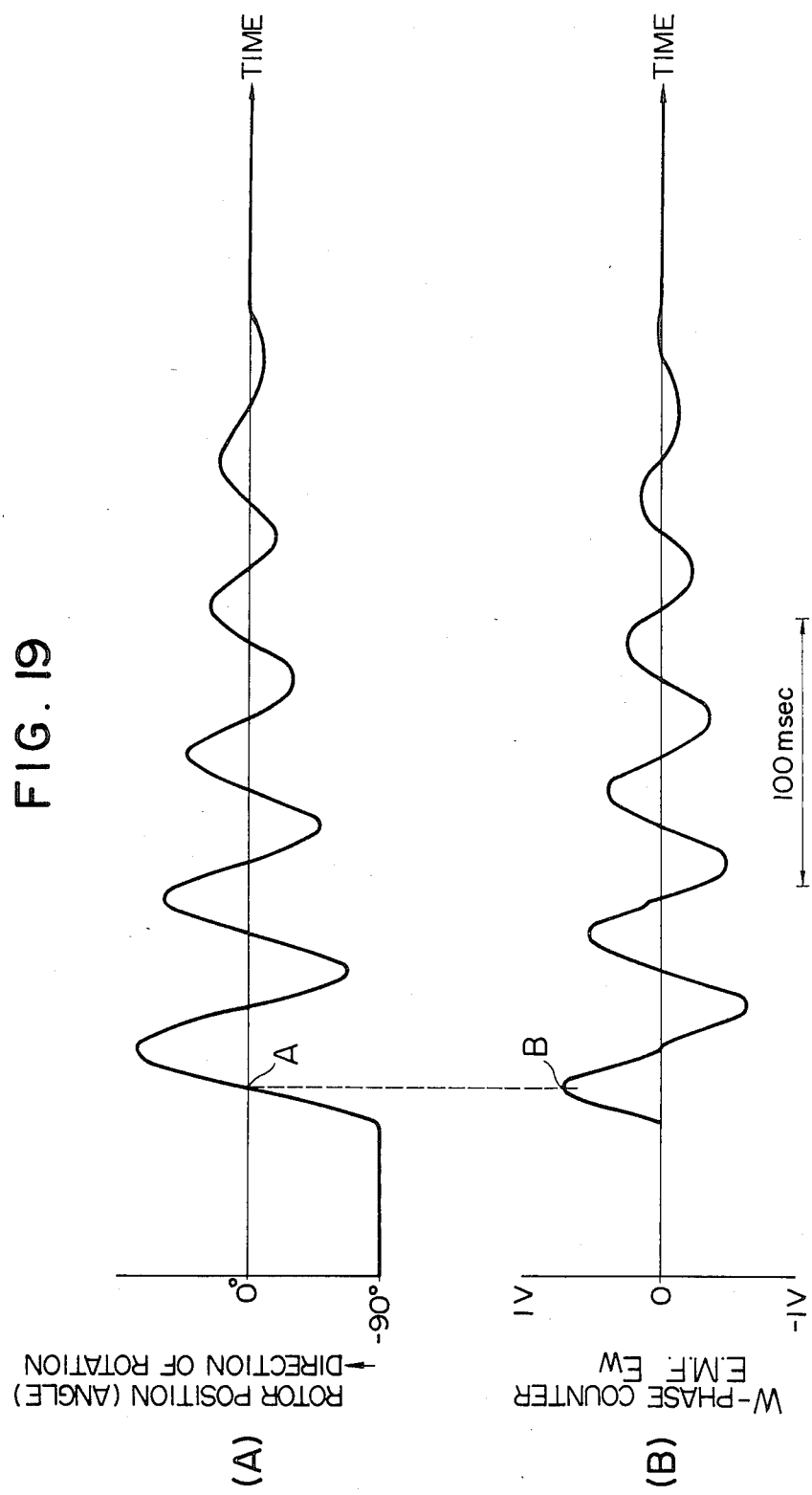
FIG. 19 is a waveform diagram showing a state of rotational oscillation of the rotor shown in FIG. 18 and a waveform of the counter e.m.f. thereby generated.

FIG. 19 shows the results of the measurement of the counter e.m.f. mentioned above. In FIGS. 19, (A) and (B) show the relation between the position of the rotor 13 and the counter e.m.f. $E_W$ generated in the W-phase armature coil with respect to the time elapsed since an exciting current is supplied to the U-phase and V-phase armature coils when the rotor 13 has been resting at the position of $-90°$ before the starting thereof.

Figure 20:
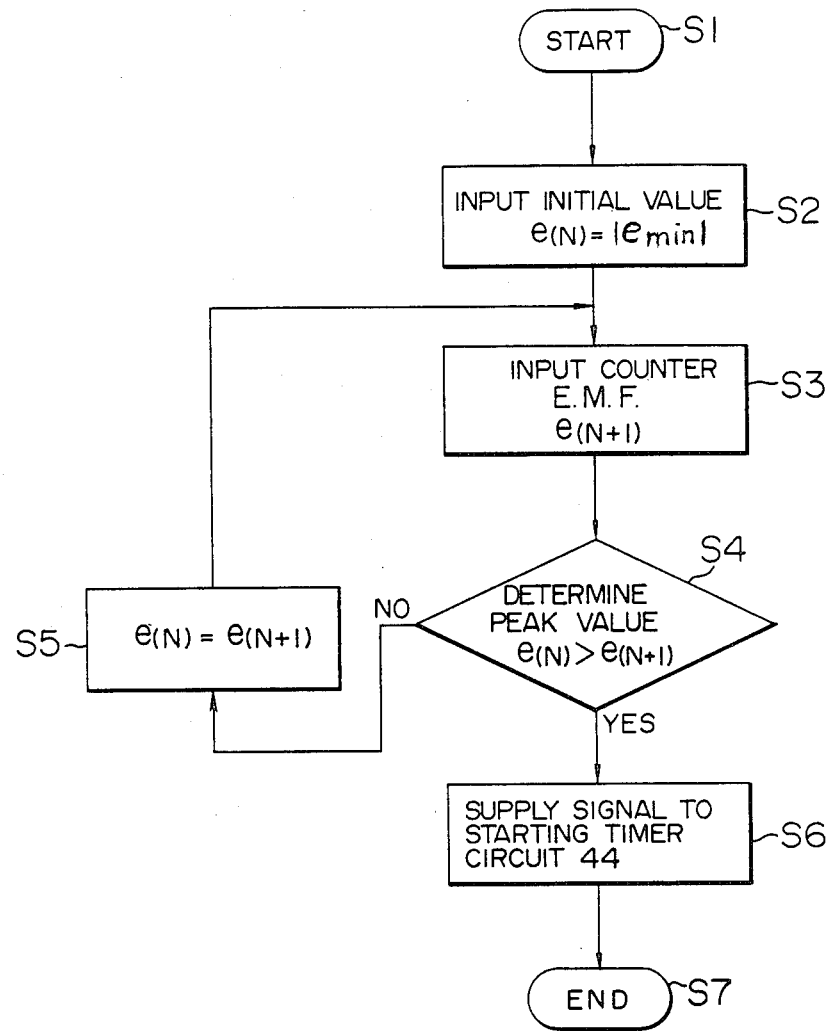
FIG. 20 is a flowcart showing a computing process executed by the microcomputer MPU shown in FIG. 18.
Figure 21:
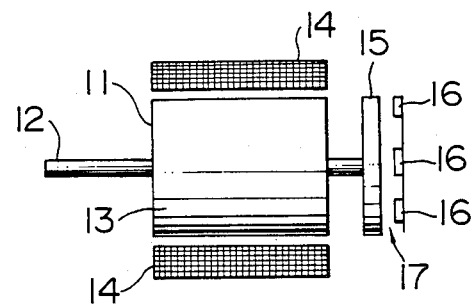
FIG. 21 is a schematic structural diagram showing the arrangement of a rotational position detecting device in a prior art brushless motor.
Figure 22:
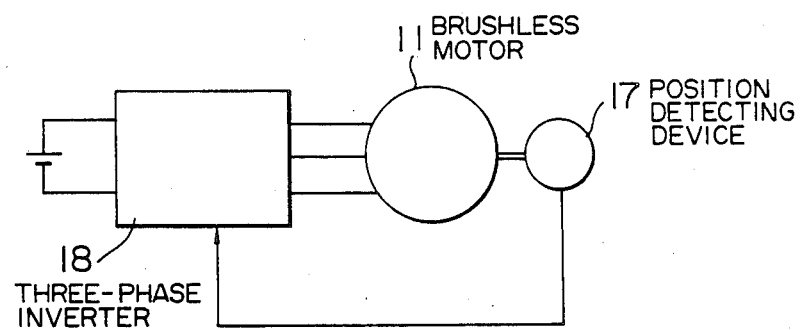
FIG. 22 is a schematic diagram showing a drive control system of the prior art motor shown in FIG. 21.

The processing performed by the MPU 26 in FIG. 18 will be described with reference to the condition shown in FIGS. 19(A) and 19(B) and a flowchart shown in FIG. 20. As shown in the flowchart, upon switching-on of the power source, the processing is started in step S1. In step S2, a numerical value of $e_{min}$ is applied to e(N) input to the MPU 26, where $e_{min}$ is a voltage value having a minimum absolute value which can be preset.

In step S3, a value of the counter e.m.f. generated in the W-phase armature coil is applied to e(N+1) input to the MPU 26. In step S4, the values of e(N) and e(N+1) are compared with each other. If e(N+1) is greater than or equal to e(N), then step S5 replaces e(N) by e(N+1). Then, in step S4, the value of e(N) replaced in step S5 is compared with a counter e.m.f. e(N+1) which is newly inputted in step S3 next time. Thus, the processing through steps S5, S3 and S4 is repeated until e(N) becomes greater than e(N+1). As soon as e(N) has become greater than e(N+1), the processing in step S6 causes the MPU 26 to supply an output signal to the starting timer circuit 44. After the completion of supplying the output signal, the processing by the MPU 26 terminates in step S7.

Here, with the intention of rotating the rotor 13 in the direction of the arrow shown in FIG. 4, the positive peak point of the counter e.m.f. generated in the W-phase armature coil is detected. Thus, as shown in FIG. 19, the output signal from the MPU 26 is supplied to the starting timer circuit 44 at a positive peak point B on the waveform of the counter e.m.f. which peak point B corresponds to a point A representing a stable position which the rotor 13 passes at a speed in the same direction of rotation as the desired rotational direction of the rotor 13.

Further, as described already, in the embodiment described above with reference to FIG. 19, since the direction of rotation of the rotor 13 has been selected to be in the direction of the arrow shown in FIG. 4, the detection of a positive peak point of the counter e.m.f. is effected. However, if the direction of rotation of the rotor 13 is selected to be in a direction opposite to the arrow, it is required only to detect a negative peak point of the counter e.m.f.

Further, although an accurate peak value point of the counter e.m.f. geneated in the W-phase armature coil is detected in the above-described embodiments, the point to be detected may deviate from the peak value point to some degree.

Although, in the above-described embodiments, a three-phase two-pole brushless motor is taken as an example, it is necessary only to select the number of poles of the permanent magnet of the rotor 13 to be a multiple of an even number except a multiple of six.

Further, although the power transistors 20a to 20f are used in the three-phase inverter circuit 20, the other elements such as thyristors, relays or the like may be used.

In addition, although the starting timer circuit 44 is used in the embodiments shown in FIGS. 1 and 18, in a case where a load on the brushless motor 11 is fixed and the revolutional oscillation of the rotor 13 always takes place, it is possible to eliminate the starting timer circuit 44, and the Q-output of the D flip-flop 42 may be supplied directly to the ring counter circuit 35 in the embodiment shown in FIG. 1, while, the output of the MPU 26 may be supplied directly to the ring counter circuit 35 in the embodiment shown in FIG. 18.

We claim:

1. A control apparatus for a brushless motor which has a stator provided with an armature winding having armature coils connected in three-phase star-connection, and a rotor comprising a permanent magnet having at least two poles, which rotor is driven by switching over an exciting current supplied to said armature coils, comprising:

a resistance circuit having a plurality of resistors connected in star-connection so that each of the resistors is in parallel with a corresponding one of the armature coils of said armature winding;

signal generating means for generating an excitation switchover signal to switch over and control the exciting current supplied to the armature coils of said armature winding in accordance with variations in a potential difference between a neutral point of said armature winding and a neutral point of said resistance circuit;

an inverter circuit for switching over and controlling the exciting current supplied to the armature coils of said armature winding in accordance with the excitation switchover signal from said signal generating means; and detecting means for detecting a stable position where said rotor stops and a direction of revolution and oscillation of said rotor and generating a detection signal indicative thereof when the exciting current is caused to flow through the armature coils for two phases at the start of said brushless motor, in response to a counter electromotive force generated in the armature coil for the other one phase due to the revolution and oscillation of said rotor while the exciting current flows through the armature coils for the two phases, and for supplying a starting signal to said inverter circuit in accordance with the detection signal.

2. A control apparatus according to claim 1, further comprising a timer circuit for supplying a starting signal to said inverter circuit when the excitation switchover signal from said signal generating means is not obtained for a predetermined time at the start of said brushless motor.

3. A control apparatus according to claim 1, wherein said signal generating means comprises (a) an integrating and detecting circuit for integrating a potential difference between a neutral point of said armature winding and a neutral point of said resistance circuit, and for detecting a point where the integrated value becomes substantially a zero level and generating a detection signal indicative thereof, and (b) a ring counter circuit which receives the detection signal from said integrating and detecting circuit and generates the excitation switchover signal every time the zero level is detected by said integrating and detecting circuit.

4. A control apparatus according to claim 3, wherein said signal generating means further comprises a starting circuit for causing said ring counter circuit to generate a particular initial excitation switchover signal, which provides an initial excitation condition, at the start of said brushless motor, and, in response to the starting signal, to generate the excitation switchover signal which provides an excitation condition advanced by two steps from said initial excitation condition.

5. A control apparatus for a brushless motor which has a stator provided with an armature winding having armature coils connected in three-phase star-connection, and a rotor comprising a permanent magnet having at least two poles, which rotor is driven by switching over an exciting current supplied to said armature coils, comprising:

a resistance circuit having a plurality of resistors connected in star-connection so that each of the resistors is in parallel with a corresponding one of the armature coils of said armature winding;

signal generating means for generating an excitation switchover signal to switch over and control the exciting current supplied to the armature coils of said armature winding in accordance with variations in a potential difference between a neutral point of said armature winding and a neutral point of said resistance circuit;

an inverter circuit for switching over and controlling the exciting current supplied to the armature coils of said armature winding in accordance with the excitation switchover signal from said signal generating means;

first detecting means for detecting a polarity of a counter electromotive force generated in the armature coil for one phase due to revolution and oscillation of said rotor when the exciting current is supplied to the armature coils for the other two phases at the start of said brushless motor; and second detecting means for detecting a stable position where said rotor stops and a direction of revolution and oscillation of said rotor and generating a detection signal indicative thereof when the exciting current is caused to flow through the armature coils for two phases at the start of said brushless motor, in accordance with the particular polarity of the counter electromotive force detected by said first detecting means and the excitation switchover signal from said signal generating means, and for supplying a starting signal to said inverter circuit in accordance with the detection signal.

6. A control apparatus according to claim 5, wherein said signal generating means comprises (a) an integrating circuit for generating an integration waveform signal by integrating a potential difference between a neutral point of said armature winding and a neutral point of said resistance circuit, (b) a zero level detecting a circuit for detecting a zero level crossing point of said integration waveform signal and generating a rectangular wave signal whose level changes every time the zero level crossing point is detected, and (c) a ring counter circuit which generates the excitation switchover signal at a rising or falling part of the rectangular wave signal.

7. A control apparatus according to claim 6, wherein said second detecting means detects a position suitable for the start of said brushless motor from among the stable positions in accordance with the particular polarity of the counter electromotive force detected by said first detecting means and the rising or falling part of the rectangular wave signal and generates a detection signal indicative of the suitable position, and said second detecting means comprises a flip-flop circuit for generating the starting signal supplied to said ring counter circuit in accordance with the detection signal from said second detecting means.

8. A control apparatus for a brushless motor which has a stator provided with an armature winding having armature coils connected in three-phase star-connection and a rotor having a permanent magnet having at least two poles, which rotor is driven by switching over an exciting current supplied to said armature coils, comprising:

a resistance circuit having a plurality of resistors connected in star-connection so that each of the resistors is in parallel with a corresponding one of the armature coils of said armature winding;

signal generating means for generating an excitation switchover signal to switch over and control the exciting current supplied to the armature coils of said armature winding in accordance with variations in a potential difference between a neutral point of said armature winding and a neutral point of said resistance circuit;

an inverter circuit for switching over and controlling the exciting current supplied to the armature coils of said armature winding in accordance with the excitation switchover signal from said signal generating means; and peak value detecting means for detecting a substantially peak value of a counter electromotive force generated in the armature coil for one phase due to revolution and oscillation of said rotor and generating a detection signal indicative thereof when the exciting current is supplied to the armature coils for the other two phases at the start of said brushless motor, and for supplying a starting signal to said inverter circuit in accordance with the detection signal.

* * * * *